United States Patent
Junge et al.

(10) Patent No.: US 9,507,185 B2
(45) Date of Patent: Nov. 29, 2016

(54) SWITCH ELEMENT COMPRISING A LIQUID CRYSTALLINE MEDIUM

(71) Applicant: MERCK PATENT GmbH, Darmstadt (DE)

(72) Inventors: Michael Junge, Pfungstadt (DE); Andreas Beyer, Hanau (DE)

(73) Assignee: Merck Patent GmbH, Darmstadt (DE)

( * ) Notice: Subject to any disclaimer, the term of this patent is extended or adjusted under 35 U.S.C. 154(b) by 192 days.

(21) Appl. No.: 14/353,594

(22) PCT Filed: Sep. 25, 2012

(86) PCT No.: PCT/EP2012/004003
§ 371 (c)(1),
(2) Date: Apr. 23, 2014

(87) PCT Pub. No.: WO2013/060406
PCT Pub. Date: May 2, 2013

(65) Prior Publication Data
US 2014/0293174 A1  Oct. 2, 2014

Related U.S. Application Data

(60) Provisional application No. 61/611,193, filed on Mar. 15, 2012.

(30) Foreign Application Priority Data

Oct. 24, 2011  (EP) .................................. 11008518

(51) Int. Cl.
| | | |
|---|---|---|
| *C09K 19/02* | (2006.01) |
| *G02F 1/1333* | (2006.01) |
| *G02F 1/13* | (2006.01) |
| *C09K 19/54* | (2006.01) |
| *C09K 19/58* | (2006.01) |
| *C09K 19/38* | (2006.01) |
| *C09K 19/42* | (2006.01) |
| *E06B 3/67* | (2006.01) |
| *C09K 19/30* | (2006.01) |
| *G02F 1/133* | (2006.01) |
| *G02F 1/1334* | (2006.01) |
| *G02F 1/137* | (2006.01) |
| *C09K 19/04* | (2006.01) |
| *C09K 19/20* | (2006.01) |

(52) U.S. Cl.
CPC ............ *G02F 1/132* (2013.01); *C09K 19/3068* (2013.01); *C09K 19/38* (2013.01); *C09K 19/42* (2013.01); *C09K 19/54* (2013.01); *C09K 19/542* (2013.01); *C09K 19/586* (2013.01); *E06B 3/6722* (2013.01); *C09K 2019/0448* (2013.01); *C09K 2019/2035* (2013.01); *C09K 2019/2078* (2013.01); *C09K 2019/3083* (2013.01); *G02F 2001/13345* (2013.01); *G02F 2001/13775* (2013.01)

(58) Field of Classification Search
CPC ................... G02F 2001/13775; G02F 1/1334; G02F 1/132; C09K 19/38; C09K 19/42
See application file for complete search history.

(56) References Cited

U.S. PATENT DOCUMENTS

| | | |
|---|---|---|
| 7,755,829 B2 | 7/2010 | Powers et al. |
| 8,072,672 B2 | 12/2011 | Powers et al. |
| 2008/0089073 A1 | 4/2008 | Hikmet |
| 2009/0015902 A1 | 1/2009 | Powers et al. |
| 2010/0271686 A1 | 10/2010 | Powers et al. |
| 2010/0308265 A1 | 12/2010 | Goldfinger |
| 2011/0234944 A1 | 9/2011 | Powers et al. |
| 2012/0140311 A1 | 6/2012 | Powers et al. |

OTHER PUBLICATIONS

International Search Report for PCT/EP2012/004003 dated Jan. 18, 2013.
Japanese Office Action for corresponding JP Application No. 2014-537508; published Jul. 26, 2016.

*Primary Examiner* — Wen-Ying P Chen
(74) *Attorney, Agent, or Firm* — Millen White Zelano & Branigan, P.C.

(57) ABSTRACT

The invention relates to a temperature-controlled switching element for the regulation of light transmission. The invention furthermore relates to a mixture comprising at least one liquid-crystalline compound, at least one monomer compound which represents a monofunctional compound, and at least one monomer compound which represents a multifunctional compound. The invention again furthermore relates to the use of the said mixture for the production of the switching element according to the invention.

11 Claims, 4 Drawing Sheets

SWITCH ELEMENT COMPRISING A LIQUID CRYSTALLINE MEDIUM

The present invention relates to a temperature-controlled switching element for the regulation of light transmission. The invention furthermore relates to a mixture comprising at least one liquid-crystalline compound, at least one monomer compound which represents a monofunctional compound, and at least one monomer compound which represents a multifunctional compound. The invention again furthermore relates to the use of the said mixture for the production of the switching element according to the invention.

The energy efficiency of buildings is increasing in importance with rising energy costs. Windows and glass facades have been identified in this connection as the elements of a building through which the majority of a building's heat energy is lost at low outside temperatures or through which the majority of the energy input into a building takes place in the case of intense insulation.

There is therefore a demand for devices which control light transmission and thus energy flow through windows or glass areas. In particular, there is a demand for devices which are able to match the energy flow through glass areas to the conditions (heat, cold, high insulation, low insulation) prevailing at the particular point in time.

Of particular interest is the provision of such devices in temperate climatic zones, in which a change from warm outside temperatures combined with high insulation (summer) to cold outside temperatures combined with low insulation (winter) takes place over the year.

For example, it is desired in the cold season for a maximum of light and thus transported heat energy to enter a building through glass areas. This enables heating and lighting costs to be saved.

On the other hand, it is desired in the warm season for the lowest possible energy input into a building through glass areas to take place. This enables a more pleasant room climate to be achieved or air-conditioning costs to be saved. Furthermore, a reduction in the incident light intensity may be desired in these cases, for example in order to reduce dazzle due to direct insulation.

There is therefore a demand for switching elements which regulate light transmission through windows or other glass areas. In particular, there is a demand for switching elements which automatically match the regulation of light transmission to the prevailing conditions, as described above (smart windows). Furthermore, there is a demand for switching elements which operate energy-efficiently, can be installed with the lowest possible technical complexity, are technically reliable and meet aesthetic demands. Further aspects are easy processability of the switching element, robustness in operation and the possibility of retrofitting to existing glass areas of buildings.

The prior art discloses devices which can be switched reversibly from a transparent state to a less light-transparent state, for example a cloudy (light-scattering) or dark-transparent state, on application of an electrical voltage (for example C. M. Lampert et al., Solar Energy Materials & Solar Cells, 2003, 489-499).

However, electrically switchable devices, such as the devices mentioned above, have the disadvantage that they cannot be matched immediately and automatically to the ambient conditions. Furthermore, they require electrical connections, which is accompanied by increased complexity during installation and an increased need for maintenance.

US 2009/0015902 and US 2009/0167971 disclose temperature-reactive devices which contain a liquid-crystalline medium in a layer between two polarisers. Switching between a state having relatively high light transmission and a state having relatively low light transmission is achieved here by a phase transition of the liquid-crystalline medium from a nematic state to an isotropic state without the application of a voltage being necessary.

However, the devices disclosed in the said applications have the disadvantage that the layer comprising the liquid-crystalline medium is liquid. The device is therefore more susceptible to damage.

It would furthermore be desirable to have available flexible switching elements which can be rolled up and cut like films. However, this is less readily possible in the case of devices containing a liquid layer since squeezing-out of the liquid and formation of air bubbles in the liquid layer may occur in these cases.

It would still furthermore be desirable to be able to vary the residual transmission of the device in the closed state and its switching properties.

Liquid-crystalline media comprising polymeric compounds are known from the prior art. For example, Appl. Phys. Lett., 84, 1233, discloses mixtures comprising liquid-crystalline compounds and polymers (polymer network liquid crystal, PDLC) for use in electrically addressed light modulators. However, mixtures of this type in many cases have the disadvantage of being cloudy or light-scattering.

The present invention relates to a temperature-controlled switching element for the regulation of light transmission, comprising
  a first polariser
  a polarisation-influencing switching layer which comprises at least one liquid-crystalline compound and at least one polymer, where the polymer comprises at least one recurring unit containing one or more mesogenic groups, and
  a second polariser,
where the switching layer is arranged between the two polarisers.

For the purposes of the present invention, the term light is taken to mean electromagnetic radiation in the UV-A, VIS and NIR region. In particular, it is taken to mean radiation which is only absorbed to a negligible extent, or not at all, by the materials usually used in windows (for example glass).

According to the definitions usually used in the area of radiation physics, UV-A light is taken to mean radiation having a wavelength of 320 to 380 nm, VIS light is taken to mean radiation having a wavelength of 380 nm to 780 nm, and NIR light is taken to mean radiation having a wavelength of 780 nm to 3000 nm. For the purposes of the present invention, the term light is therefore taken to mean radiation having a wavelength of 320 to 3000 nm.

For the purposes of the present invention, the term switching element for the regulation of light transmission is taken to mean a device which covers a defined area and reduces the transmission of light through this area to a varying extent, depending on the switching state in which the device exists.

The term liquid-crystalline compound is taken to mean a compound which exhibits liquid-crystalline properties under certain conditions, and in particular a compound which forms a nematic liquid-crystalline phase under certain conditions.

For the purposes of the present invention, a mesogenic group is taken to mean a structural element which, even alone, i.e. even without interaction with a further group, such as a spacer group or a reactive group (cf. disclosure regarding monomer compounds below), causes the compound to have liquid-crystalline properties. Mesogenic groups are typically chemical groups or units as also occur in low-molecular-weight, unreactive liquid-crystalline compounds. Examples are, inter alia, biscyclohexyls, phenylcyclohexyls, biphenyls and phenylbenzoates.

In accordance with the invention, the mesogenic group is present in at least one recurring unit of the polymer. It may be present in a side chain and/or in the main chain of the polymer. It is preferably present in the side chain.

A recurring unit is taken to mean a unit of the polymer which occurs multiple times, at least twice, in the polymer. The number of occurrences in the polymer preferably corresponds to the proportion of monomer comprising the recurring unit in the monomers employed for the polymerisation.

Preferably, at least 10% of the recurring units of the polymer contain one or more mesogenic groups, particularly preferably at least 30%, very particularly preferably at least 60% and even more preferably at least 90%. Most preferably, essentially all recurring units of the polymer contain one or more mesogenic groups.

In accordance with the invention, the two switching states of the switching element are a switching state having relatively high light transmission through the switching element (switching state I or open state) and a switching state having relatively low light transmission through the switching element (switching state II or closed state).

In accordance with the present application, the difference in light transmission between the two states is known as the switching range of the device.

In accordance with the invention, the switching element is temperature-controlled, which is taken to mean that the switching process can be effected by a change in the temperature of the device. The two switching states of the device are consequently associated with two different temperature ranges of the device. The temperature control of the switching element takes place in accordance with the invention in a temperature range between 0° C. and 80° C., preferably between 10° C. and 70° C. and very particularly preferably between 20° C. and 60° C.

According to a preferred embodiment of the invention, the switching state having relatively high light transmission through the switching element exists at relatively low temperatures of the switching element, and the switching state having relatively low light transmission exists at relatively high temperatures of the switching element.

The way in which the switching element functions is based on incident light being polarised by the first polariser. This means that only light having certain polarisation properties is allowed to pass through the polariser. The polarisation-influencing switching layer, in one of the two switching states, changes the polarisation properties of the polarised light which leaves the first polariser and enters the switching layer. A higher or lower proportion of the polarised light is thus able to pass through the second polariser, depending on how the plane of polarisation thereof is arranged relative to that of the first polariser. In the other of the two switching states, the polarisation-influencing switching layer does not change the polarisation properties of the light passing through it or only does so to a small extent.

This will be illustrated with reference to an example: if the two planes of polarisation of the polarisers are rotated by an angle x relative to one another and if the switching layer in the first switching state of the switching element likewise rotates the plane of polarisation by an angle x, the majority of the light which has passed through the first polariser also passes through the second polariser and thus through the entire switching element. In the other of the two switching states of the switching layer, the plane of polarisation of the light is not rotated by the switching layer or is only rotated slightly, meaning that, owing to the rotation of the planes of polarisation of the two polarisers relative to one another, only a small part of the light which passes through the first polariser is allowed to pass through the second polariser. In this state of the switching element, only a small part of the light which hits the switching element thus passes through it. In this example, the polarisation-influencing state of the switching layer is thus associated with switching state I, and the inactive state which does not influence the polarisation is associated with switching state II.

In all cases, however, the state of the switching layer (polarisation-influencing or inactive) determines the state of the switching element (switching state I or switching state II). In accordance with the invention, the polarisation-influencing state of the switching layer is associated with a liquid-crystalline, optically anisotropic state of the layer, and the inactive state of the switching layer is associated with an isotropic state of the layer. However, a residual anisotropy of the switching layer may remain here due to anisotropic polymer.

In general, an isotropic state of the switching layer is taken to mean a state of substantial isotropy. It is not excluded here that a residual anisotropy is also present in the state referred to as isotropic. This may be caused, for example, by the polymer, which has at least partly anisotropic properties in both states of the device.

According to a preferred embodiment, the switching layer is in the polarisation-influencing state in switching state I of the switching element and in the inactive state in switching state II.

In accordance with the invention, the switching process between the two switching states does not proceed abruptly at a certain temperature which separates the two above-mentioned temperature ranges, but instead proceeds gradually in a transition region which is in a temperature span. This temperature span of the transition region preferably has a width of 5 to 100 degrees Celsius, i.e. proceeds, for example, at between 15 and 110° C. The temperature span particularly preferably has a width of 10 to 50 degrees Celsius.

For the purposes of the present application, the transition region between the two switching states is taken to mean the temperature region in which less than 0.8 times the transmission of the switching state having the relatively high light transmission and more than 1.2 times the transmission of the switching state having the relatively low light transmission are present.

It is apparent to the person skilled in the art that a broader transition region of the switching process is associated with lower sensitivity of switching to a temperature change, and conversely a narrow transition region of the switching process is associated with higher sensitivity of the switching process to a temperature change.

Instead of a description of the above-mentioned sensitivity of the switching process through the breadth of the transition region, it is alternatively possible, and exchangeably for the person skilled in the art, also for a description to take place via the relative slope of the curve of a plot of transmission (y axis) against temperature (x axis). In this case, a curve slope with a large value is associated with high sensitivity of the switching process, and a curve slope with a small value is associated with low sensitivity of the switching process.

According to a possible embodiment of the invention, the temperature span of the transition region between the two switching states has a breadth of 5 to 30 degrees Celsius, particularly preferably a breadth of 10 to 20 degrees Celsius (switching element type A' having high sensitivity of the switching process).

An embodiment of this type is preferred if the switching process is to take place in the narrowest possible temperature range (high sensitivity of the switching process, cf. above). This can be achieved in accordance with the invention, for example, through the use of a small proportion of polymer in the switching layer or through the use of suitable monomer types in the polymerisation reaction to give the polymer. Explicit variants of this embodiment are described in a following section.

According to an alternative embodiment of the invention, the temperature span of the transition region between the two switching states has a breadth of 30 to 100 degrees Celsius, particularly preferably a breadth of 50 to 80 degrees Celsius (switching element type B' having low sensitivity of the switching process). An embodiment of this type is preferred if the switching process is to take place over an extended temperature range (low sensitivity of the switching process, cf. above). This can be achieved in accordance with the invention, for example, through the use of a relatively high proportion of polymer in the switching layer or through the use of suitable monomer types in the polymerisation reaction to give the polymer. Explicit variants of this embodiment are described in a following section.

According to a possible embodiment of the invention, the switching state having relatively low light transmission has a transmission in the VIS region of greater than 5%, preferably greater than 10%, particularly preferably greater than 15% and very particularly preferably greater than 25%, where this transmission is effected by the polarisation-influencing switching layer (switching element type B" having high residual transmission).

Such an embodiment of the switching element which also has significant transmission in the switching state having relatively low light transmission may be preferred in use types in which complete blocking of light transmission is not to occur in any case. This is conceivable, for example, on use of the switching element in a window of an office or residential building.

It should be emphasised here that the above-mentioned light transmission in the switching state having relatively low light transmission in devices such as the switching elements according to the invention can in principle also be influenced by the arrangement of the polarisers relative to one another. Possibilities for this purpose are familiar to the person skilled in the art. For example, increased light transmission in the switching state having relatively low light transmission can be achieved by an arrangement in which the directions of polarisation of the polarisers have been rotated by an angle other than 90° relative to one another.

As explicitly mentioned above, however, the transmission of greater than 5%, preferably greater than 10% and particularly preferably greater than 25% in the above-mentioned embodiment according to the invention is effected by the switching layer and not by the position of the polarisers relative to one another.

This can be achieved in accordance with the invention, for example, through the use of monomers having high values for the birefringence $\Delta n$ in the polymerisation to give the polymer, in particular through the use of high proportions of such monomers and/or through a high proportion of polymer in total in the mixture of polymer and liquid-crystalline compound in the switching layer.

According to an alternative preferred embodiment of the invention, the switching state having relatively low light transmission has a transmission in the VIS region of at most 5%, preferably at most 4% and particularly preferably at most 3% (switching element type A" having low residual transmission).

This can be achieved in accordance with the invention through the use of monomers having low values for the birefringence $\Delta n$ in the polymerisation to give the polymer, in particular through the use of low proportions of such monomers and/or through a low proportion of polymer in total in the mixture of polymer and liquid-crystalline compound in the switching layer.

According to an alternative particularly preferred embodiment, embodiments A' (switching element having high sensitivity of the switching process) and A" (switching element having low residual transmission) occur in combination in a switching element according to the invention. A particularly preferred switching element of this type having the above-mentioned properties is referred to as switching element of type A.

According to a particularly preferred embodiment, embodiments B' (switching element having low sensitivity of the switching process) and B" (switching element having high residual transmission) occur in combination in a switching element according to the invention. A particularly preferred switching element of this type having the above-mentioned properties is referred to as switching element of type B.

It has been found in accordance with the invention that the setting of certain parameters relating to the concentration of the monomers used for the polymerisation reaction to give the polymer, the birefringence $\Delta n$ thereof and the number of reactive functional groups therein (monofunctional vs. multifunctional monomers) enables either switching elements of type A or of type B to be obtained. These aspects will be discussed in greater detail in a following section.

The switching element according to the invention is preferably characterised in that it contains no devices for electrical control of the switching process. It particularly preferably contains absolutely no devices for electrical control, such as, for example, wires, cables, electrical connections or circuits.

The switching element according to the invention is preferably installed in any desired structural opening of a building or another compartment which is substantially sealed off from the outside.

The switching element is particularly preferably installed in a structural opening in a side wall or ceiling of a building.

In principle, however, openings of all types in a compartment which is substantially sealed off from the outside are suitable for the installation of the switching element, so long as they have light transmission.

For the purposes of the present application, a compartment which is substantially sealed off from the outside is taken to mean, in particular, a building or individual rooms in a building. The building here can be, inter alia, a private building, for example a residential building, or a public building or commercially used building, such as, for example, a factory building, a warehouse or an office building. According to an alternative embodiment, however, the compartment may also be a vehicle, for example a car or truck, or a container, for example a transport container.

Preference is given to structural openings such as windows or ceilings having a size of greater than 0.5 m², particularly preferably greater than 1 m², very particularly preferably greater than 3 m². This is due to the fact that high energy uptake into the room occurs through such areas if they are irradiated by the sun, so long as no suitable measures are taken to reduce the light transmission and thus the energy uptake into the room. Preference is furthermore given to structural openings which are subjected to high insulation owing to their spatial orientation and/or the geographical and climatic location of the building.

The switching element is preferably arranged covering the entire area of the structural opening, enabling light transmission through the opening to be regulated as completely as possible. In one possible embodiment, a single switching element provides the coverage. In an alternative embodiment, however, a plurality of switching elements, which are either arranged directly adjacent to one another or leaving gaps, can also provide the coverage.

In many cases, the structural opening will be covered by a transparent material, for example by a glass sheet or a Plexiglas sheet. According to a preferred embodiment, the switching element according to the invention is applied directly to this sheet.

An application of this type can be carried out by retrofitting an existing arrangement or by complete re-installation.

An embodiment of the covering of a structural opening which is advantageous from the point of view of thermal insulation is an arrangement comprising two or more glass sheets, where the interspace between the glass sheets is filled with air or with a special gas mixture (multipane insulating glass). Correspondingly, it is preferred in accordance with the invention to install the switching element in the interior of a multipane insulating-glass sheet of this type or externally on a sheet of this type.

Preference is generally given to the use on a side of a sheet facing towards the interior or in the interspace between two glass sheets in the case of multipane insulating glass. However, other arrangements are also conceivable and to be preferred in certain cases. The person skilled in the art will be able to balance advantages and disadvantages of certain arrangements with respect to the durability of the switching element, optical and aesthetic points of view, practical points of view with respect to cleaning of the sheets and with respect to the reactivity of the switching element to temperature changes in the room and the external environment relative to one another and to select an optimum design for the present case.

According to a preferred embodiment, the switching element is characterised in that it has an area of at least 0.05 m², preferably from 0.1 m² to 20 m² and particularly preferably from 0.2 m² to 5 m².

According to a preferred embodiment, the switching element is used to influence the light transmission as a function of the temperature, particularly preferably for influencing the light transmission emanating from the sun into a room.

In the case of the use according to the invention, the preferred embodiments of the switching element mentioned above and also shown in the following parts are likewise preferred.

The light transmission from the environment into a room means energy input into the room, which, owing to general physical laws, results in an increase in the temperature of the room. Influencing of the light transmission by the switching element according to the invention thus means not only that the light input, inter alia in the form of VIS light, into a room can be regulated, but also that the heat input and thus the temperature of the room can be regulated. The present invention likewise relates to the use of the switching element for this purpose.

Owing to the temperature dependence of the switching element described above, where, according to a preferred embodiment, the open switching states exists at a relatively low temperature and the closed switching state exists at a relatively high temperature, self-regulation of the temperature of the room can thus occur. The light transmission and thus the heat input here is increased at a low temperature, so that the temperature of the room rises. Correspondingly, the light transmission and thus the heat input is reduced at a relatively high temperature, so that the temperature of the room drops.

Switching between the two switching states takes place in a temperature-regulated manner. According to a preferred embodiment, the switching element is used in a purely temperature-regulated manner without the switching layer being influenced by the application of an electric field.

As is known to the person skilled in the art, the polarisation-influencing switching layer, which comprises, inter alia, at least one liquid-crystalline compound, can be changed from one switching state to another switching state under certain conditions by the application of an electric field. Electrically effected influencing of the switching layer of this type and thus of the entire switching element may be preferred under certain conditions, for example in order to restore an original state of the switching layer after a relatively large number of switching processes. However, it should be noted that it is a feature of the invention that the switching element is used for regular use in a purely temperature-controlled manner, and that the use according to the invention of the switching element does not require application of an electric field.

Preference is furthermore given to a use of the switching element in which the light transmission is influenced, inter alia, in the NIR region. Radiation in the NIR region makes a large contribution to the input of energy into rooms through windows. Owing to the device design according to the invention, in particular in the preferred embodiments, influencing of the light transmission at a wavelength in the range from 1000 to 1500 nm is particularly preferred.

In a preferred embodiment of the invention, the polarisation-influencing switching layer of the switching element is arranged between two substrate layers.

In accordance with the invention, the substrate layers can consist, inter alia, of polymeric material, of metal oxide, for example ITO, of glass or of metal. They preferably consist of glass or ITO or polymeric material.

In addition to the components indicated above, the switching element according to the invention may also comprise further elements, for example one or more alignment layers. Particularly preferably, precisely two alignment layers are present. These are preferably each arranged between the substrate layer and the switching layer. The alignment layers may also serve as substrate layers, meaning that no substrate layers are necessary in the device. In a preferred embodiment of the invention, the alignment layers consist of rubbed polyimide or rubbed polyacrylate.

However, it is likewise possible and under certain conditions advantageous in accordance with the present invention for the switching element to comprise no alignment layer adjacent to the switching layer.

It is furthermore preferred for the switching element according to the invention to comprise one or more filter layers, preferably one or more UV filter layers. The switching element particularly preferably comprises a UV filter which blocks light having a wavelength of less than 300 nm, preferably light having a wavelength of less than 320 nm, particularly preferably light having a wavelength of less than 340 nm and very particularly preferably light having a wavelength of less than 360 nm.

In accordance with the invention, the switching element has two or more polarisers, one of which is arranged on one side of the switching layer and another is arranged on the opposite side of the switching layer. The switching layer and the two polarisers are preferably arranged parallel to one another here.

The polarisers can be linear polarisers or circular polarisers. Preferably, precisely two polarisers are present in the device. In this case, it is furthermore preferred for the polarisers to be either both linear polarisers or both circular polarisers.

If two linear polarisers are present in the device, it is preferred in accordance with the invention for the directions of polarisation of the two polarisers to be rotated by an angle of 45° to 135°, particularly preferably 70° to 110° and very particularly preferably 80° to 100° relative to one another.

The polarisers can be reflective or absorptive polarisers. A reflective polariser in the sense of the present application reflects light of one direction of polarisation or one type of circular-polarised light, while it is transparent to light of the other direction of polarisation or the other type of circular-polarised light. Correspondingly, an absorptive polariser absorbs light of one direction of polarisation or one type of circular-polarised light, while it is transparent to light of the other direction of polarisation or the other type of circular-polarised light.

For the purposes of the present invention, both absorptive and reflective polarisers can be employed. Preference is given to the use of polarisers which are in the form of thin optical films. Examples of reflective polarisers which can be used in the device according to the invention are DRPF (dif-fusive reflective polariser film, 3M), DBEF (dual brightness enhanced film, 3M), DBR (layered-polymer distributed Bragg reflectors, as described in U.S. Pat. No. 7,038,745 and U.S. Pat. No. 6,099,758) and APF films (advanced polariser film, 3M, cf. Technical Digest SID 2006, 45.1, US 2011/0043732 and U.S. Pat. No. 7,023,602). Furthermore, polarisers based on wire grids (WGP, wire-grid polarisers) which reflect infrared light can be employed. Examples of absorptive polarisers which can be employed in the devices according to the invention are the Itos XP38 polariser film and the Nitto Denko GU-1220DUN polariser film. An example of a circular polariser which can be used in accordance with the invention is the APNCP37-035-STD polariser (American Polarizers). A further example is the CP42 polariser (ITOS).

Polarisers are typically not equally effective throughout the spectrum of the UV-A, VIS and NIR region. According to a preferred embodiment, the switching element according to the invention comprises polarisers which polarise light, inter alia, in the NIR region.

According to a preferred embodiment of the invention, the first and second polarisers are each, identically or differently, an absorptive linear polariser or a reflective linear polariser. Particularly preferably, either both polarisers are absorptive linear polarisers or both polarisers are reflective linear polarisers. According to a further preferred embodiment, the polariser facing outwards, i.e. away from the room, is a reflective polariser.

In a possible embodiment according to the invention, the two polarisers are the substrate layers between which the switching layer is arranged, i.e. no additional substrate layers are present in the device.

In a further preferred embodiment of the invention, the switching layer is located between flexible layers, for example flexible polymer films. The device according to the invention is thus flexible in shape and bendable and can, for example, be rolled up. The flexible layers can be either substrate layer, alignment layer and/or polarisers. Further layers, which are preferably likewise flexible, may additionally be present.

Furthermore, the switching layer has in accordance with the invention a gelatinous or at least viscous consistency. This has the advantage of greater robustness of the device. Furthermore, the device according to the invention comprising a gelatinous switching layer may be cuttable, which represents an advantage in handling.

It was indicated above that the state of the switching layer decides whether the switching element is in the open state (switching state I) or in the closed state (switching state II).

According to a preferred embodiment, the switching layer in the switching state having relatively high light transmission has the property of rotating the plane of polarisation of linear-polarised light. According to a preferred embodiment, the switching layer in this switching state rotates the plane of polarisation by a value of 70 to 110°, preferably by a value of 80 to 100° and particularly preferably by a value of 85 to 95°. Correspondingly, the switching layer in the switching state having relatively low light transmission has the property of only rotating the plane of polarisation of linear-polarised light to a slight extent, or not at all.

However, an embodiment of the switching layer in which rotation of the plane of polarisation of the light by more than 360° occurs in the twisted nematic state of the device, i.e. a plurality of complete rotations of the plane of polarisation occur, is also possible in accordance with the invention.

The state of the switching layer in the switching state having relatively high light transmission (switching state I) is particularly preferably a twisted nematic state. Correspondingly, the state of the switching layer in the switching state having relatively low light transmission (switching state II) is an isotropic state. A residual anisotropy is not excluded in the isotropic state.

In accordance with the invention, the switching layer comprises at least one liquid-crystalline compound and at least one polymer, where the polymer comprises at least one recurring unit containing one or more mesogenic groups.

A mixture of different liquid-crystalline compounds is preferably present in the switching layer. At least 5 and at most 15 different liquid-crystalline compounds are particularly preferably present in the switching layer.

The liquid-crystalline compounds can be selected as desired from liquid-crystalline compounds known to the person skilled in the art. Preference is given to liquid-crystalline compounds of limited size and molecular weight (small molecules). It is particularly preferred for the liquid-crystalline compound to have a molecular weight of not greater than 1000 Da, very particularly preferably not greater than 800 Da and most preferably not greater than 600 Da.

The mixture of the liquid-crystalline compounds (or, in the case where only one liquid-crystalline compound is used, the individual liquid-crystalline compound) preferably has a clearing point of between −20° C. and 200° C., particularly preferably a clearing point of between 10° C. and 180° C. Owing to the clearing point-changing properties of the polymer present in the switching layer, mixtures or compounds having high clearing points, for example between 80° C. and 200° C., preferably 100° C. to 180° C. and particularly preferably between 120° C. and 160° C., are, in particular, also suitable for use in the switching element according to the invention.

The liquid-crystalline compounds preferably conform to the following formula (F-1):

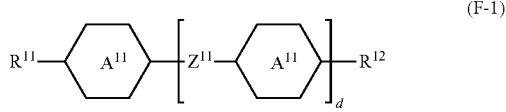

where
R$^{11}$, R$^{12}$ on each occurrence, identically or differently, represent F, Cl, CN, NCS, SCN, R$^{13}$—O—CO—, R$^{13}$—CO—O— or an alkyl or alkoxy group having 1 to 10 C atoms or an alkenyl or alkenyloxy group having 2 to 10 C atoms, where one or more hydrogen atoms in the above-mentioned groups may be replaced by F or Cl, and one or more CH$_2$ groups may be replaced by O or S; and R$^{13}$ on each occurrence, identically or differently, represents an alkyl group having 1 to 10 C atoms, in which one or more hydrogen atoms may be replaced by F or Cl, and in which one or more CH$_2$ groups may be replaced by O or S; and

is selected on each occurrence, identically or differently, from

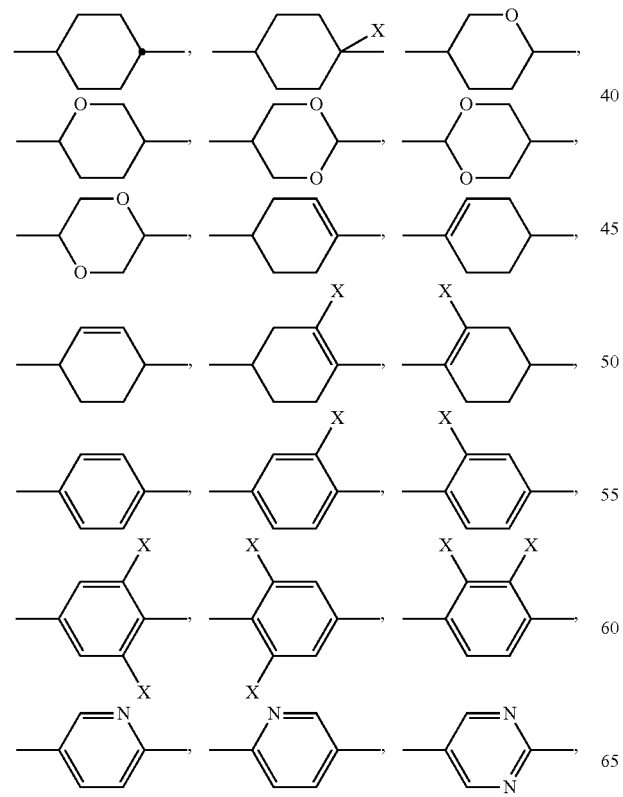

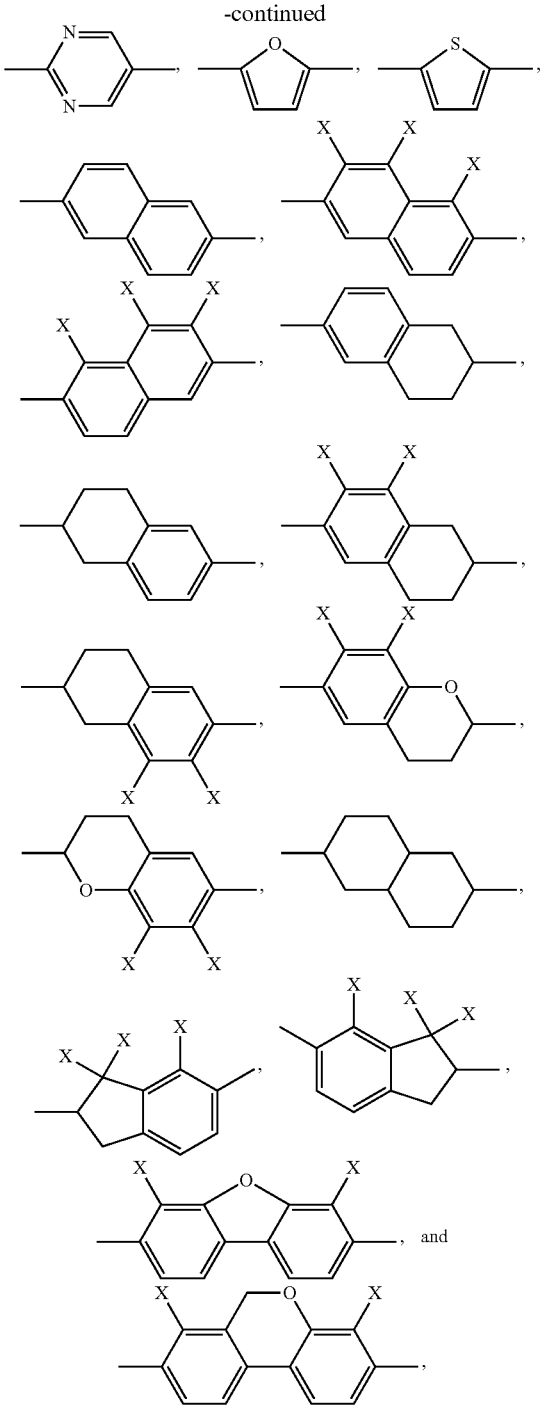

where
X is selected on each occurrence, identically or differently, from F, Cl, CN or an alkyl, alkoxy or alkylthio group having 1 to 10 C atoms, where one or more hydrogen atoms in the above-mentioned groups may be replaced by F or Cl, and where one or more CH$_2$ groups in the above-mentioned groups may be replaced by O or S; and Z$^{11}$ is selected on each occurrence, identically or differently, from —CO—O—, —O—CO—, —CF$_2$—CF$_2$—, —CF$_2$—O—, —O—CF$_2$—, —CH$_2$—CH$_2$—, —CH=CH—, —CF=CF—, —CF=CH—, —CH=CF—, —C≡C—, —OCH$_2$—, —CH$_2$O— and a single bond; and d adopts a value of 0, 1, 2, 3, 4, 5 or 6, preferably 0, 1, 2 or 3, particularly preferably 1, 2 or 3.

Groups of the sub-formula

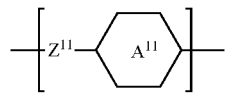

may be identical or different on each occurrence.

For use as liquid-crystalline compounds, particular preference is given to the mixtures of liquid-crystalline compounds disclosed in the as yet unpublished applications GB 1007088.6, EP 10005251.3, GB 1009488.6, EP 10008779.0 and EP 10013797.5.

It is preferred in accordance with the invention for the liquid-crystalline compound or the mixture of liquid-crystalline compounds to be present in the switching layer in a proportion of at least 50%, preferably at least 60%, particularly preferably at least 70% and very particularly preferably at least 80%.

The switching layer preferably comprises one type of polymer, i.e. a polymer which was obtained in precisely one polymerisation reaction from corresponding monomers. However, an embodiment in which a plurality of different polymers are used in the switching layer, i.e. polymers which were obtained in a plurality of different polymerisation reactions, optionally using different monomers, is likewise possible.

It is preferred in accordance with the invention for the polymer to be present in the switching layer in a proportion of at most 50%, preferably at most 40%, particularly preferably at most 30% and very particularly preferably at most 20%.

The liquid-crystalline compound and the polymer are furthermore preferably in the form of a homogeneous mixture in the switching layer. A homogeneous mixture is taken to mean, in particular, a mixture which appears clear when observed with the naked eye. It is preferably taken to mean a mixture which has no inclusions, particles or other inhomogeneities having a size of greater than 20 µm, particularly preferably greater than 10 µm, very particularly preferably greater than 1 µm, when observed using a microscope.

The homogeneity of the mixture present in the switching layer is important for the external appearance of the switching element. In particular, the best possible homogeneity of the mixture of the switching layer results in the switching element appearing clear when looked through and having the lowest possible haze and scattering.

It is preferred in accordance with the invention for the switching layer to comprise one or more chiral dopants in addition to the liquid-crystalline compound and the polymer.

Chiral dopants are preferably used in a total concentration of 0.01% to 3%, particularly preferably 0.05% to 1%, in the mixture of the switching layer. In order to obtain high values for the twist, the total concentration of the chiral dopants may also be selected higher than 3%, preferably up to a maximum of 10%.

The concentration of these compounds and other components present in relatively small amounts is disregarded when specifying the concentrations of the liquid-crystalline compounds and the polymer.

Preferred dopants are the compounds depicted in the following table:

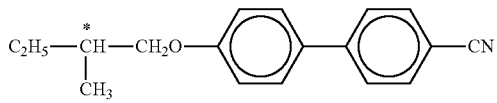

C 15

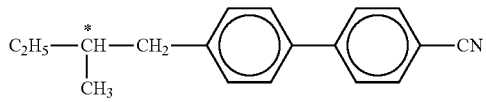

CB 15

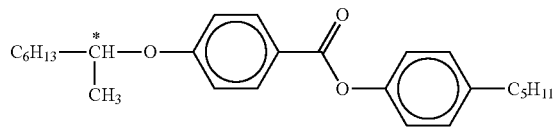

CM 21

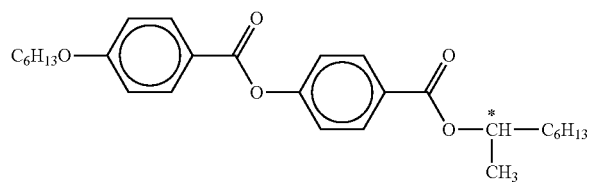

R S-811/S-811

-continued
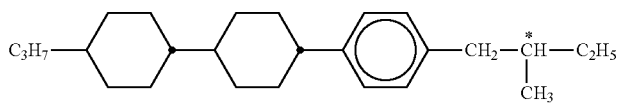
CM 44
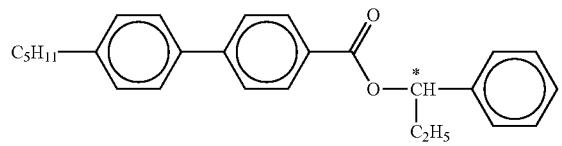
CM 45
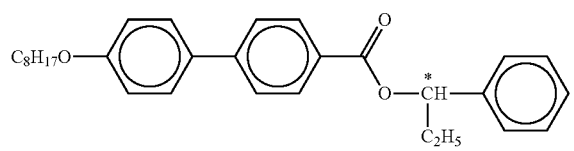
CM 47
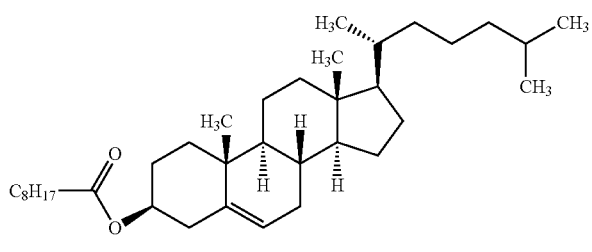
CN
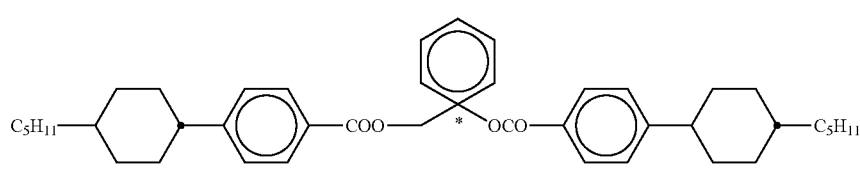
R-1011/S-1011
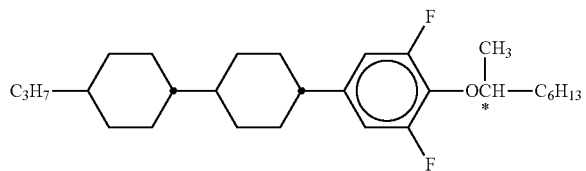
R-2011/S-2011
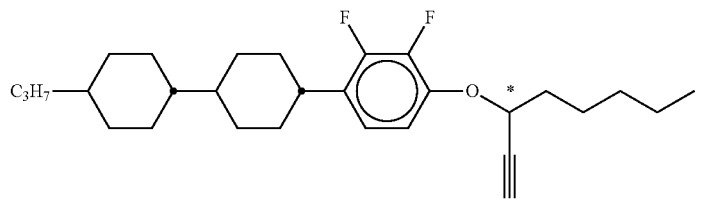
R-3011/S-3011

-continued

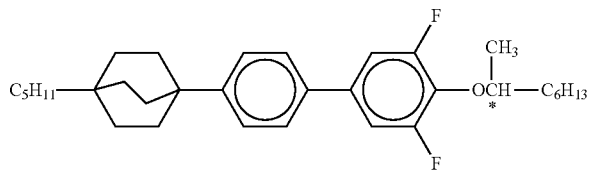

R-4011/S-4011

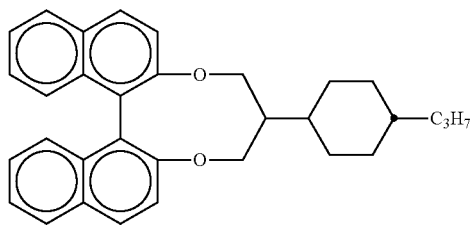

R-5011/S-5011

The switching layer furthermore preferably comprises one or more stabilisers. The total concentration of the stabilisers is preferably between 0.00001% and 10%, particularly preferably between 0.0001% and 1% of the mixture as a whole. The concentration of these compounds and other components present in relatively small amounts is disregarded when specifying the concentrations of the liquid-crystalline compounds and the polymer.

Preferred stabiliser compounds are shown in the following table:

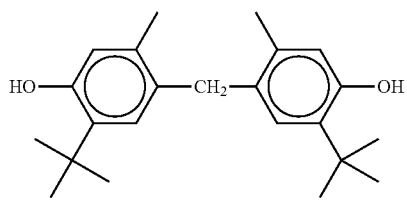

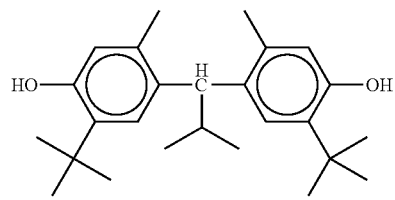

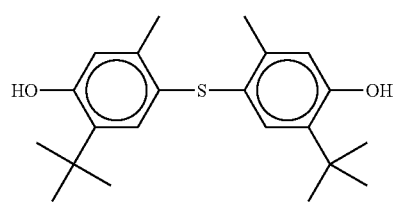

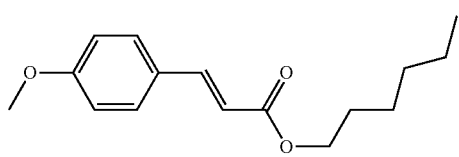 [SMILES: CCCCCCOC(=O)/C=C/c1ccc(OC)cc1]

-continued
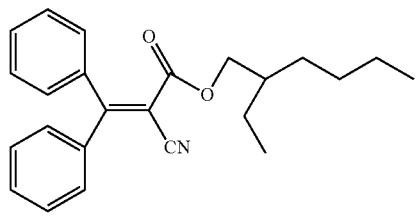 [SMILES: CCCCC(CC)COC(=O)C(C#N)=C(c1ccccc1)c1ccccc1]
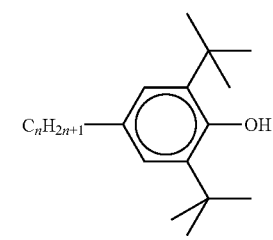
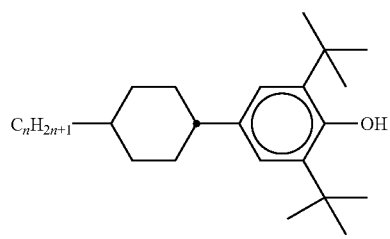
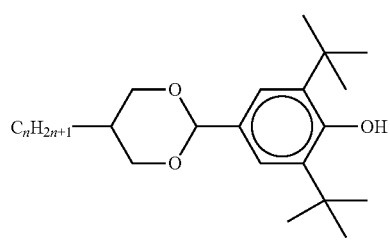
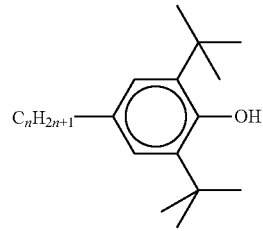
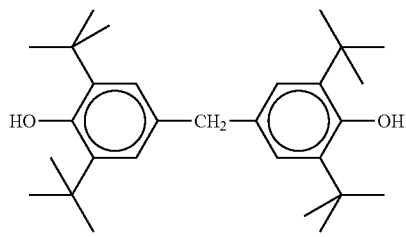

-continued
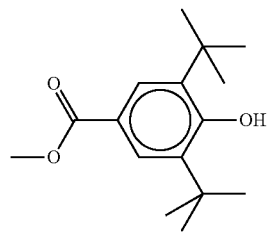
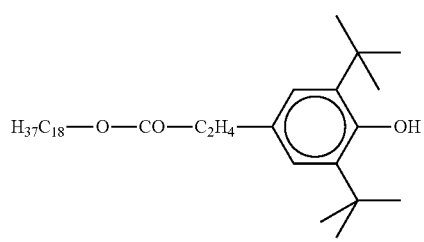
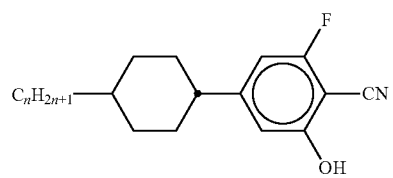
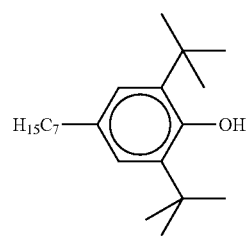
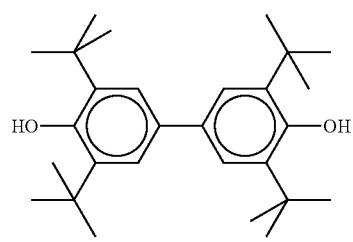

-continued
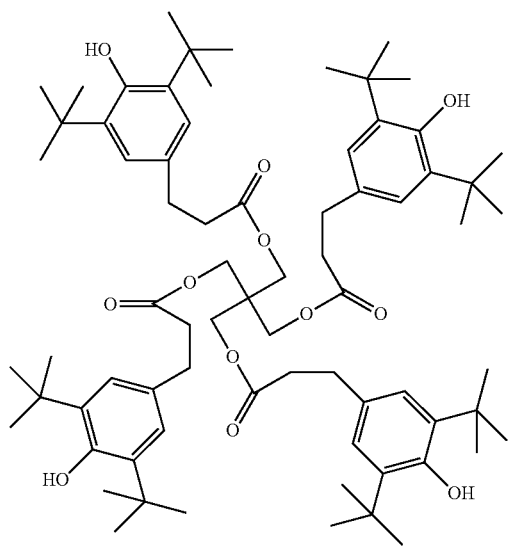 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
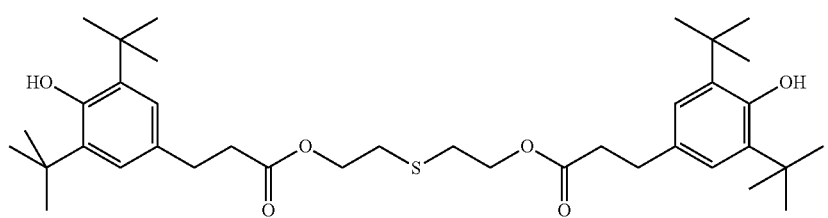 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
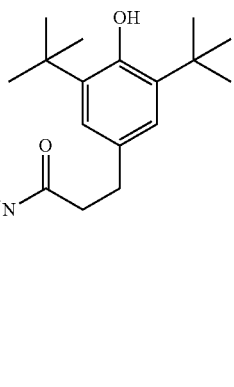
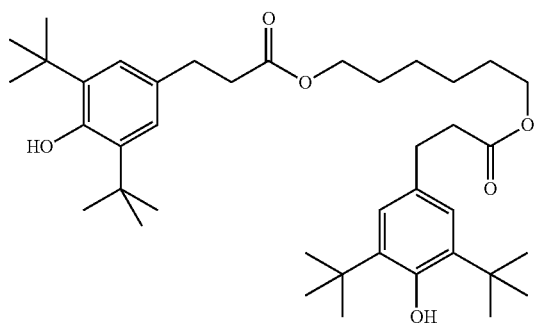 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]

-continued
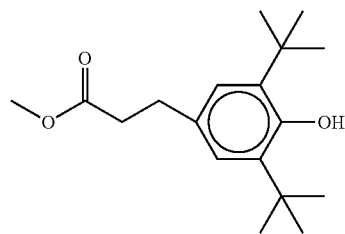
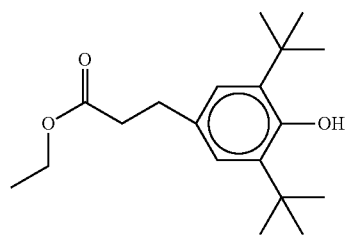
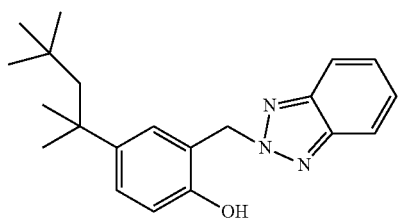 [SMILES: CC(C)(C)CC(C)(C)c1ccc(O)c(Cn2nc3ccccc3n2)c1]
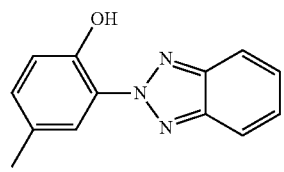 [SMILES: Cc1ccc(O)c(-n2nc3ccccc3n2)c1]
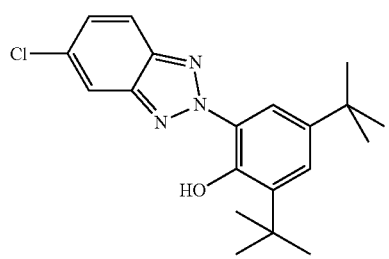 [SMILES: CC(C)(C)c1cc(-n2nc3ccc(Cl)cc3n2)c(O)c(C(C)(C)C)c1]
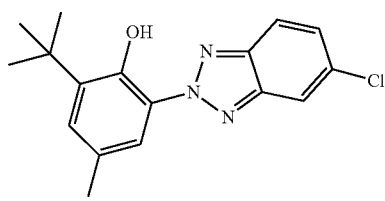 [SMILES: Cc1cc(-n2nc3ccc(Cl)cc3n2)c(O)c(C(C)(C)C)c1]

-continued
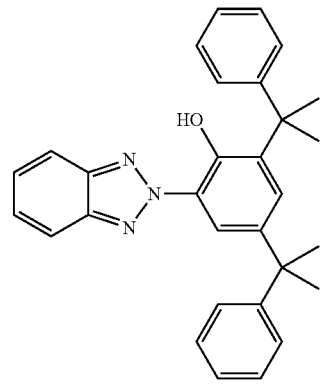 [SMILES: CC(C)(c1ccccc1)c1cc(-n2nc3ccccc3n2)c(O)c(C(C)(C)c2ccccc2)c1]
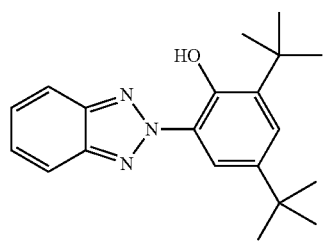 [SMILES: CC(C)(C)c1cc(-n2nc3ccccc3n2)c(O)c(C(C)(C)C)c1]
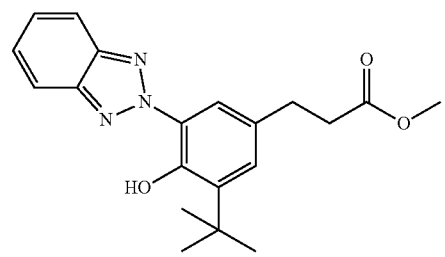 [SMILES: COC(=O)CCc1cc(-n2nc3ccccc3n2)c(O)c(C(C)(C)C)c1]
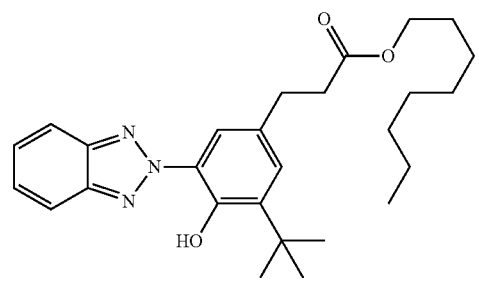 [SMILES: CCCCCCCCOC(=O)CCc1cc(-n2nc3ccccc3n2)c(O)c(C(C)(C)C)c1]
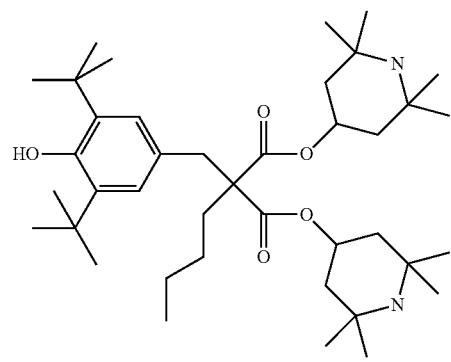 [SMILES: CCCCC(Cc1cc(C(C)(C)C)c(O)c(C(C)(C)C)c1)(C(=O)OC1CC(C)(C)NC(C)(C)C1)C(=O)OC1CC(C)(C)NC(C)(C)C1]

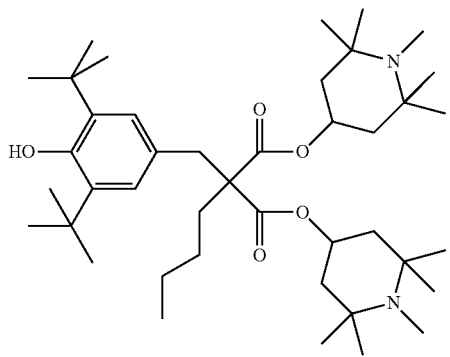 [SMILES: CCCCC(Cc1cc(C(C)(C)C)c(O)c(C(C)(C)C)c1)(C(=O)OC1CC(C)(C)N(C)C(C)(C)C1)C(=O)OC1CC(C)(C)N(C)C(C)(C)C1]
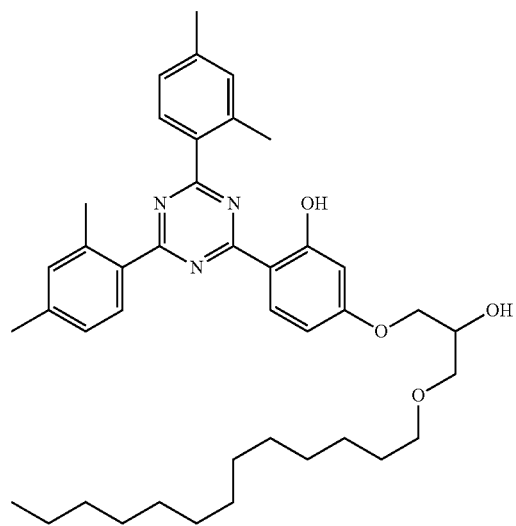 [SMILES: CCCCCCCCCCCCCOCC(O)COc1ccc(-c2nc(-c3ccc(C)cc3C)nc(-c3ccc(C)cc3C)n2)c(O)c1]
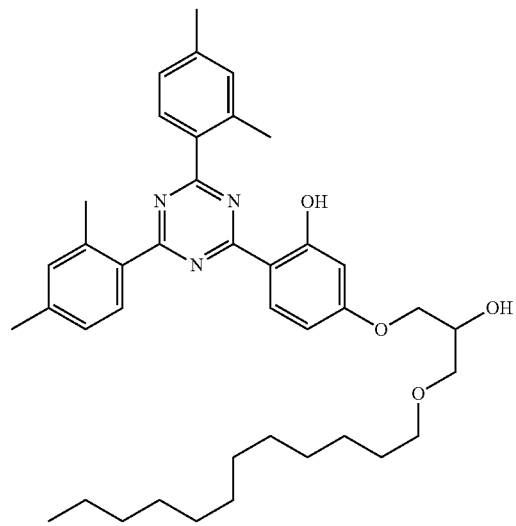 [SMILES: CCCCCCCCCCCCOCC(O)COc1ccc(-c2nc(-c3ccc(C)cc3C)nc(-c3ccc(C)cc3C)n2)c(O)c1]

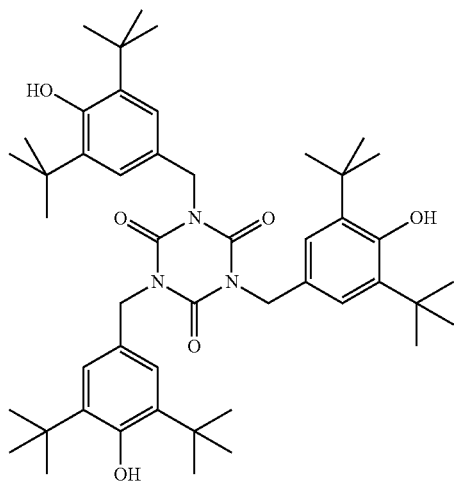 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
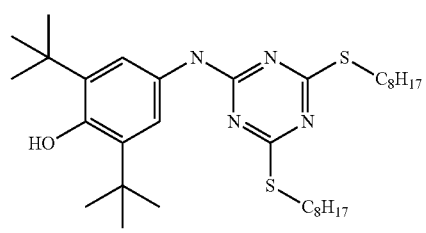
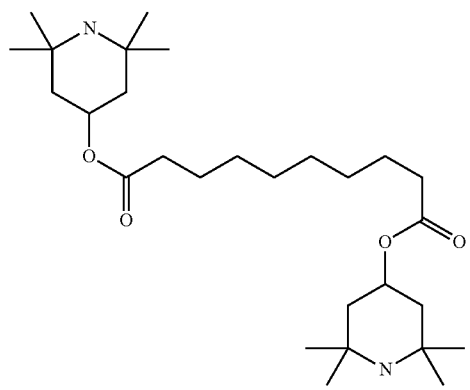
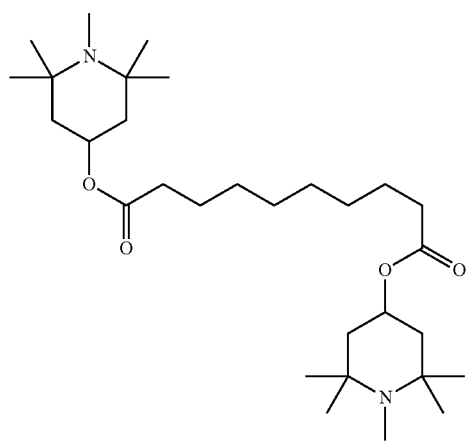

-continued
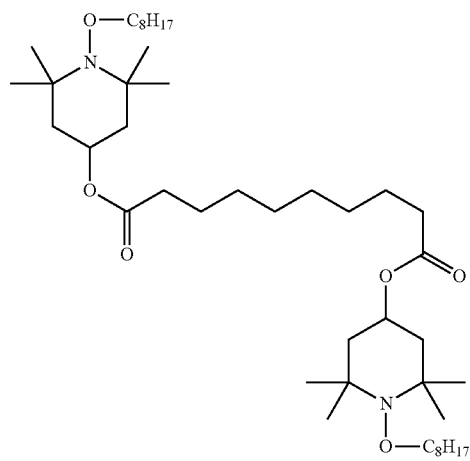
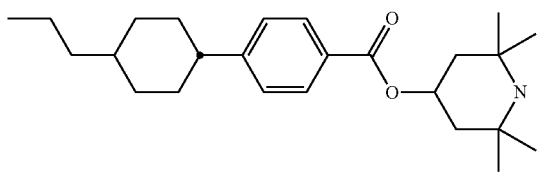
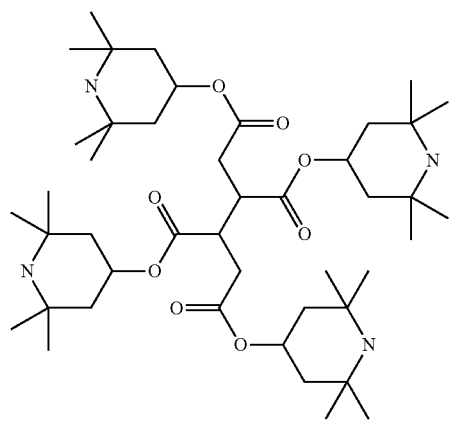
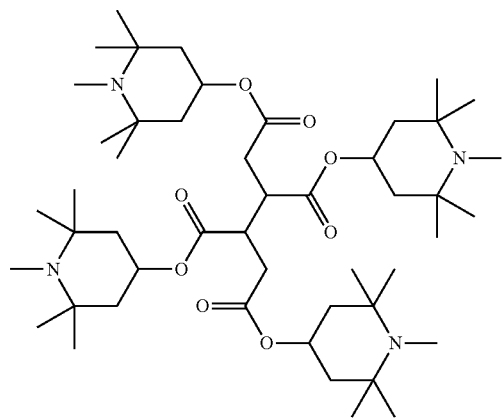

-continued

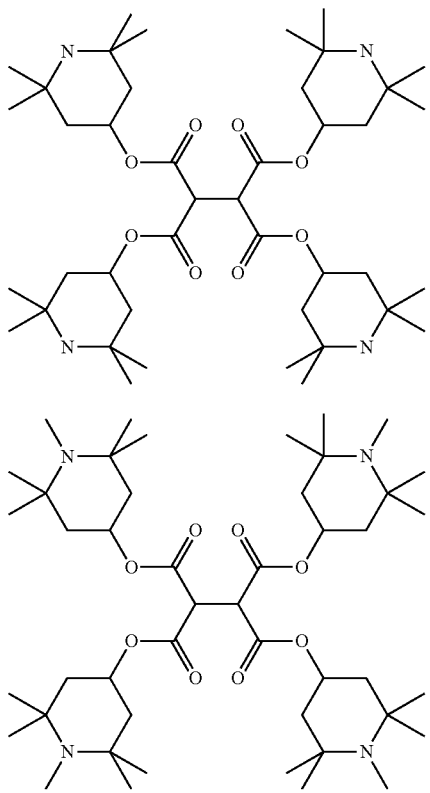

According to a preferred embodiment of the invention, the switching layer comprises less than 1% by weight of dichroic dye molecules, particularly preferably less than 0.1% by weight of dichroic dye molecules and very particularly preferably less than 0.01% by weight of dichroic dye molecules.

In particular, so-called guest/host systems, in which dichroic dye molecules are doped into a liquid-crystalline material, do not represent a preferred embodiment of the invention.

The polymer is preferably formed by a polyaddition reaction from corresponding identical or different monomers. The polymerisation reaction preferably takes place via a photochemically initiated reaction, but may also in accordance with the invention be initiated thermally. The polymer is particularly preferably formed by a UV light-induced polyaddition reaction. A polymerisation of this type has the advantage that, compared with other polymerisation types, higher purity of the polymer can be achieved. Furthermore, the UV light-induced polymerisation reaction can be controlled extremely well and proceeds very quickly. Undesired side reactions, such as decomposition or oxidation, of the mixture components are again furthermore avoided.

The polymer is preferably formed from monomer compounds each containing one or more groups selected from acrylate groups, vinyl ether groups and epoxide groups. Particular preference is given to monomer compounds containing one, two, three or four acrylate groups, very particular preference is given to monomer compounds containing one or two acrylate groups (so-called monoacrylates or diacrylates).

Preference is given in accordance with the invention to monomers which contain reactive groups of just one type, for example exclusively acrylate groups. However, it is also possible to use monomers which have mixed functionality, i.e. each contain one or more reactive groups of one type and one or more reactive groups of another type, for example one acrylate group and one epoxide group.

For the purposes of the present invention, an acrylate group is preferably taken to mean a group of the following formula (A-1):

(A-1)

where the dashed bond represents the bond to the remainder of the monomer, and $R^{21}$ represents any desired organic radical, preferably H or an alkyl group having 1 to 10 C atoms, particularly preferably H. A corresponding situation applies to a monomer containing two or more acrylate groups.

It is furthermore preferred for the polymer to be formed from two or more different monomer compounds, where at least one monomer compound represents a monofunctional compound, preferably a monoacrylate, and at least one other monomer compound represents a multifunctional compound, preferably a diacrylate.

The multifunctional compound here is preferably present in a proportion of at most 80% of all monomer compounds, particularly preferably in a proportion of at most 70% and very particularly preferably in a proportion of at most 60%. These conditions preferably apply to the diacrylate monomer.

The diacrylate to monoacrylate ratio in the mixture is preferably 1:20 to 2:1, particularly preferably 1:15 to 3:2 and very particularly preferably 1:10 to 1:1.

It is preferred for at least one monomer in the polymerisation reaction in which the polymer of the switching layer of the switching element according to the invention is formed to contain one or more mesogenic groups.

The proportion of the monomers containing one or more mesogenic groups in the polymerisation reaction in which the polymer is formed is preferably at least 10%, based on the total amount of monomers employed. It is particularly preferably at least 30%, very particularly preferably at least 60% and more preferably at least 90%.

It is particularly preferred for essentially all monomers for the preparation of the polymer to contain one or more mesogenic groups.

An advantage of the use of monomers containing mesogenic groups consists in that the liquid-crystalline phase is stable over a broad concentration range of monomer employed. It has furthermore been found that the use of monomers containing mesogenic groups improves the homogeneity of the resultant mixture and reduces light scattering.

In the case where at least two different monomers are used in the polymerisation reaction, it may be preferred for at least one monomer to contain no mesogenic groups and for at least one monomer to contain one or more mesogenic groups.

Monomer compounds in accordance with the present invention preferably have a basic structure of the formula (M-1) or (M-2):

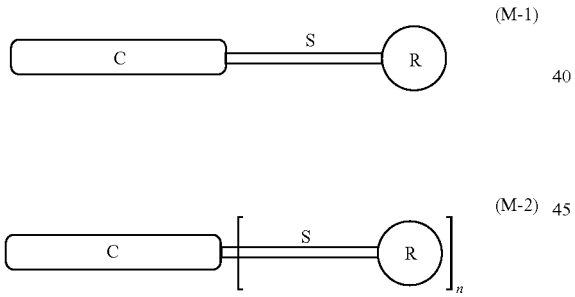

where the group C represents a mesogenic group which is bonded to the group S or groups S. It particularly preferably contains at least one aryl, heteroaryl or cyclohexyl group.

The group S furthermore represents any desired spacer group. It can represent a single bond, a single atom or a chain having a length of 2 to 20 atoms. It preferably represents a chain having a length of 2 to 10 atoms, particularly preferably an alkylene, alkyleneoxy or alkylenedioxy group. In delimitation from the mesogenic group, the spacer group represents a flexible group, which can point and move freely in all spatial directions, whereas the mesogenic group typically has restricted mobility.

The group R represents any desired reactive group which is able to polymerise in the polyaddition reaction, preferably an acrylate, vinyl ether or epoxide group. The index n has a value of 2 to 5, preferably 2 to 4 and particularly preferably 2.

Particular preference is given to monomer compounds of the formula (M-1) or formula (M-2), which conform to one of the two formulae (M-1-1) and (M-2-1)

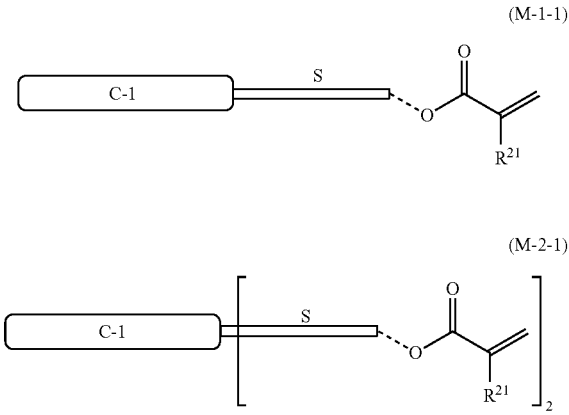

where the group C-1 represents a mesogenic group which has high birefringence Δn, the group S is as defined above, and $R^{21}$ is as defined above.

Particular preference is furthermore given to monomer compounds of the formula (M-1) or formula (M-2), which conform to one of the two formulae (M-1-2) or (M-2-2)

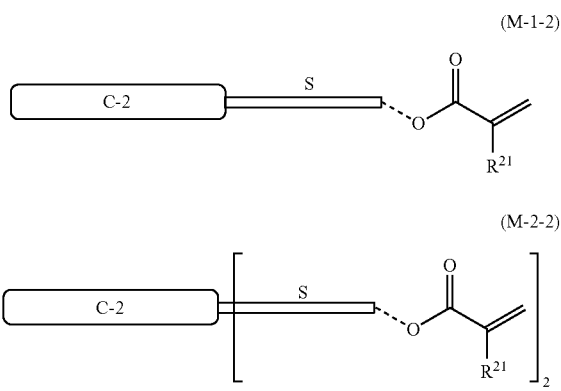

where the group C-2 represents a mesogenic group which has low birefringence Δn, the group S is as defined above, and $R^{21}$ is as defined above.

Particularly preferred monomer compounds of the formula (M-1-1) are depicted below:

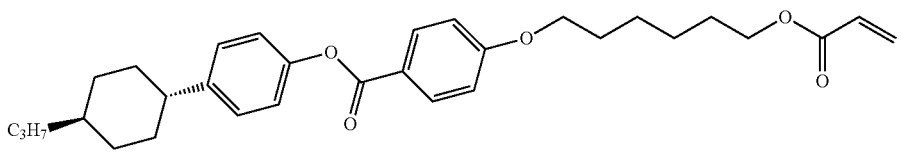

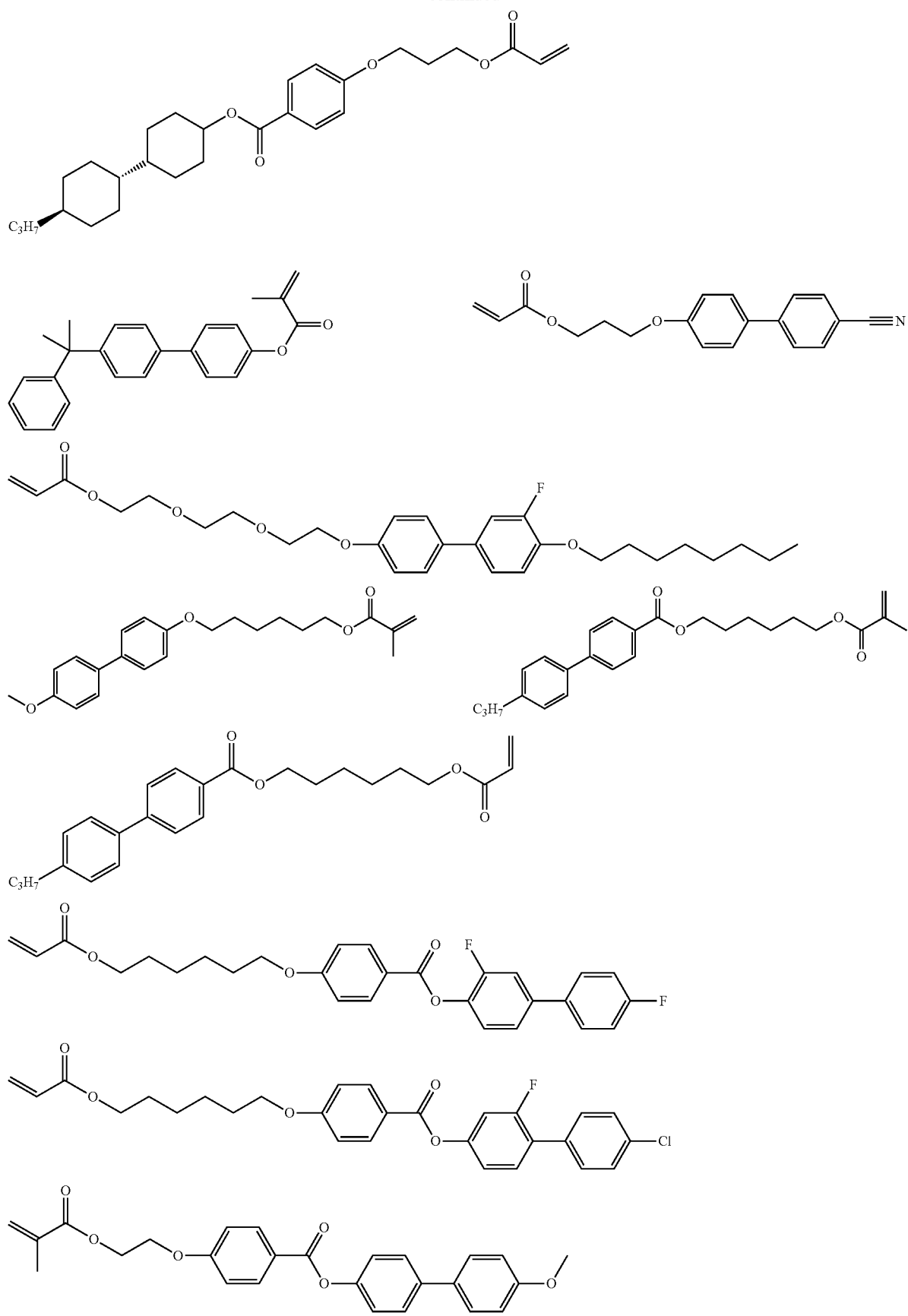

-continued
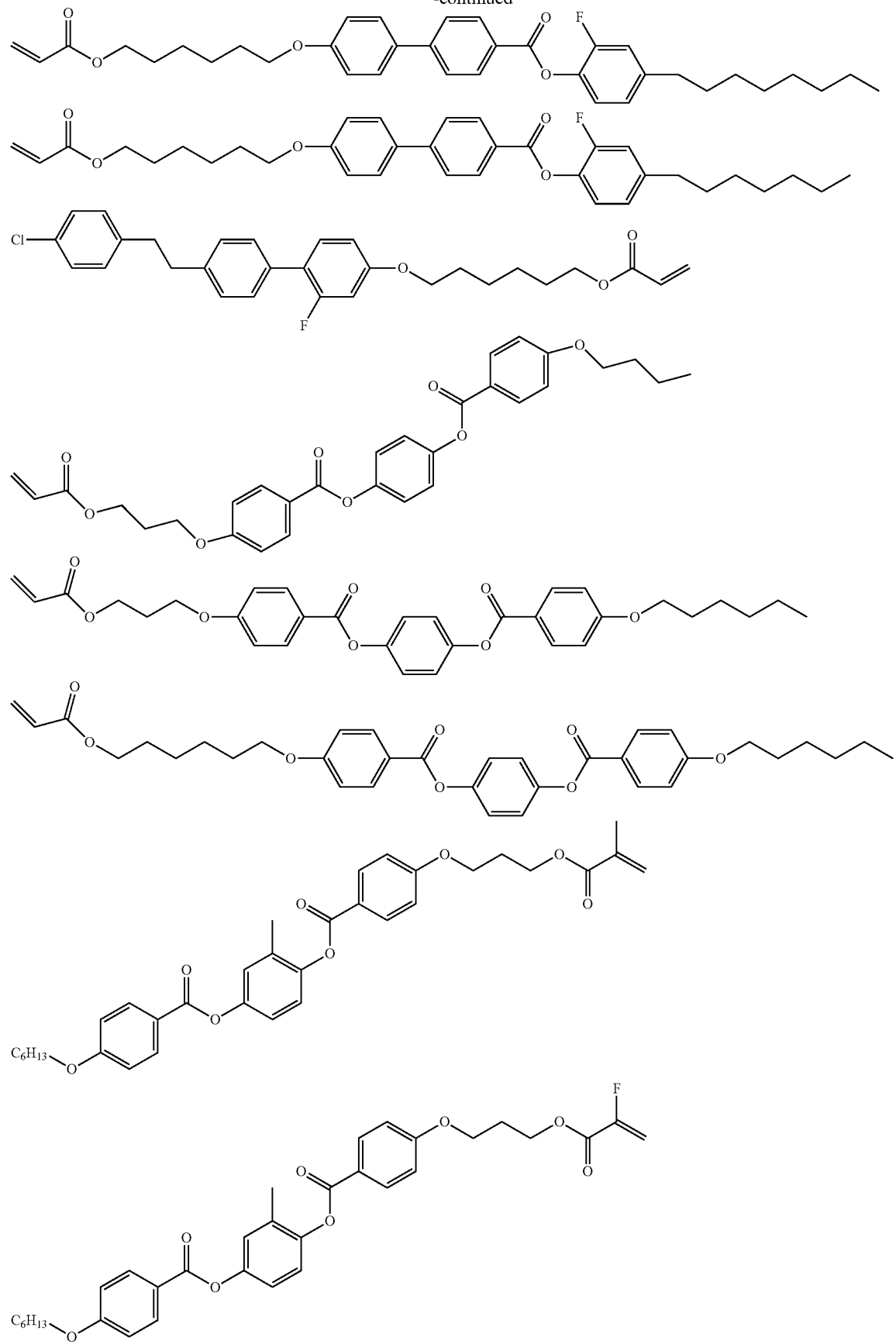

-continued
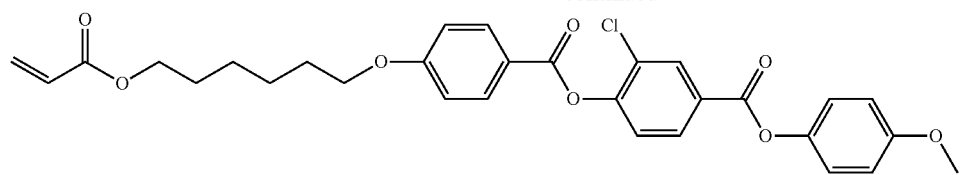
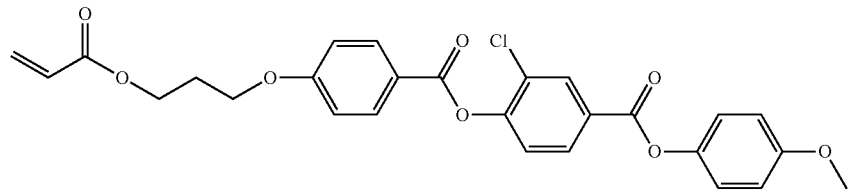
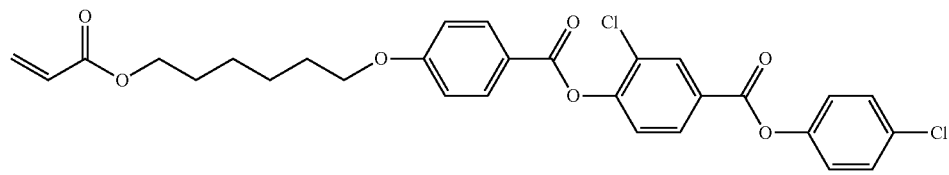
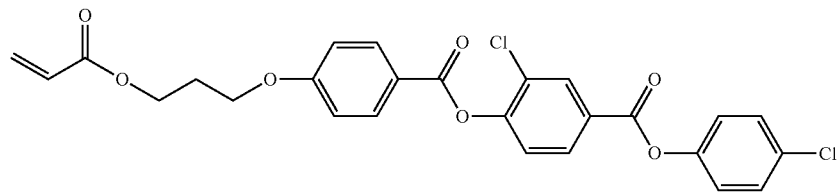
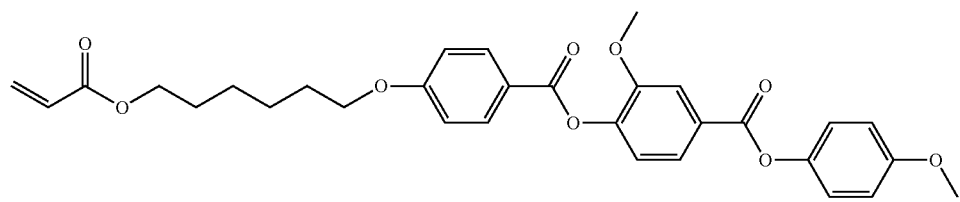
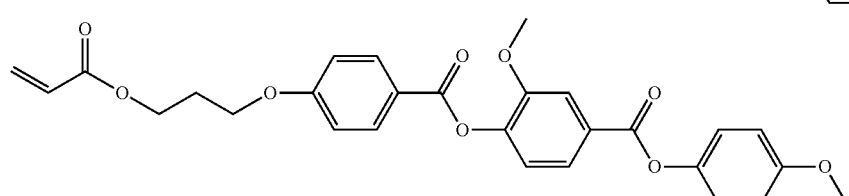
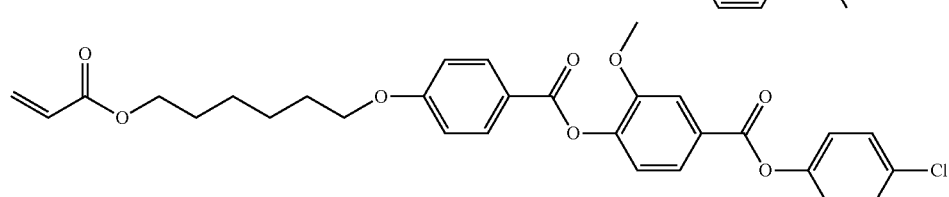
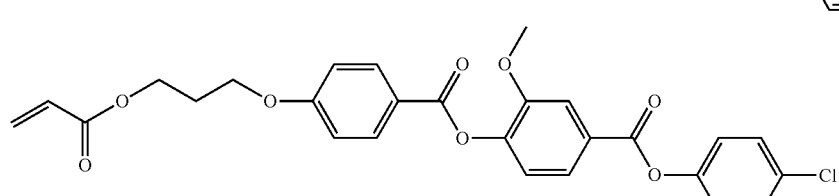
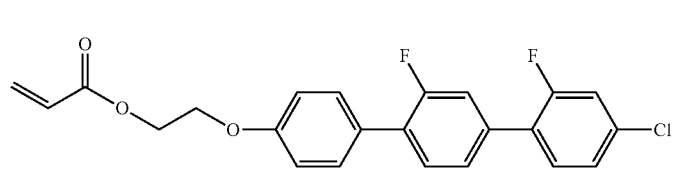

-continued
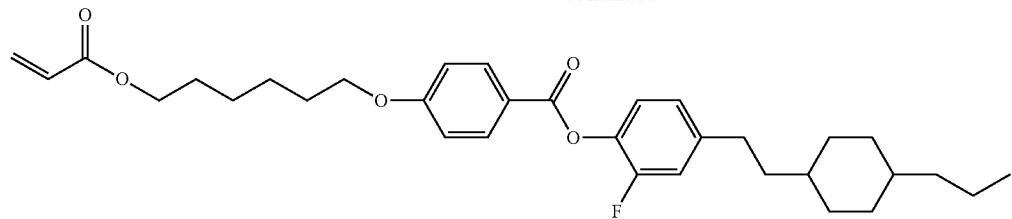
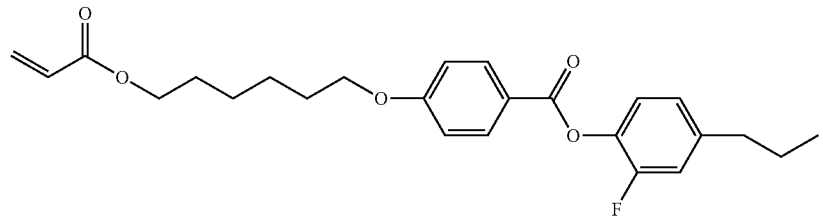
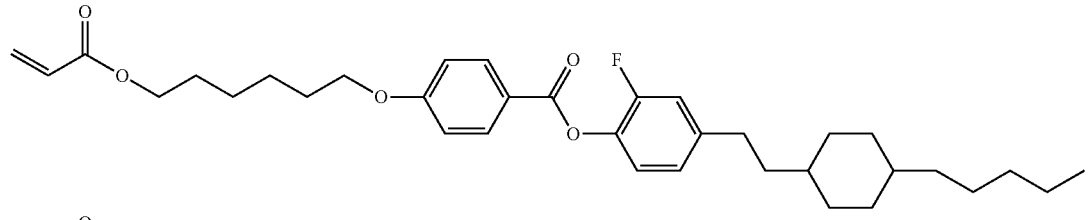
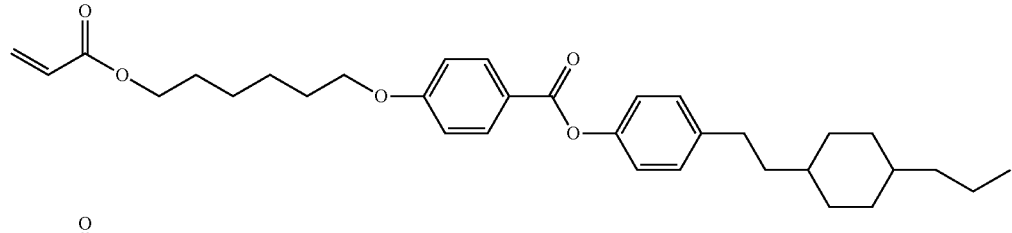
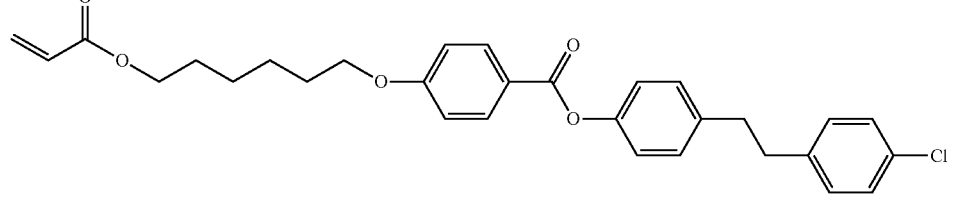
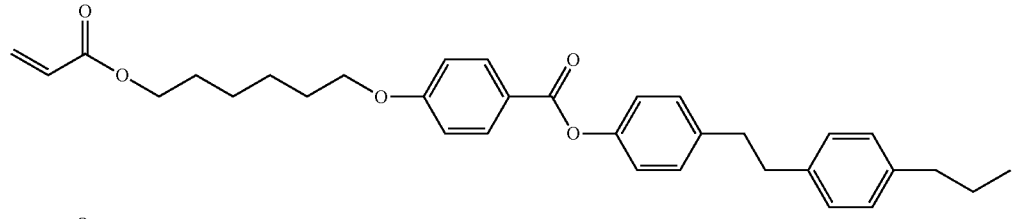
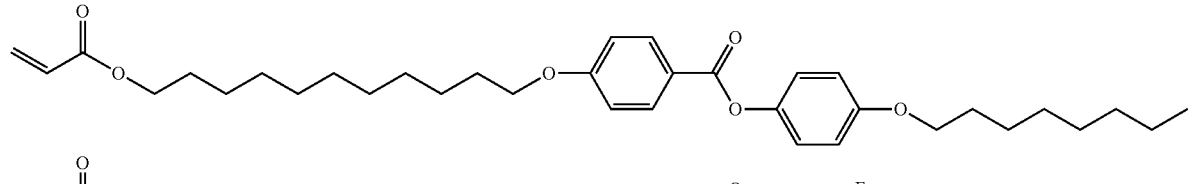
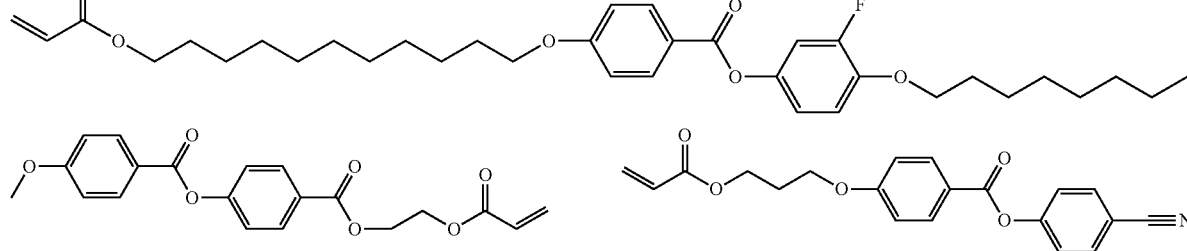
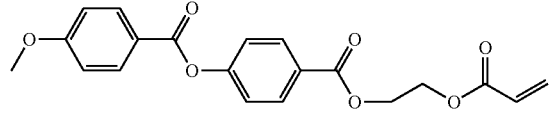
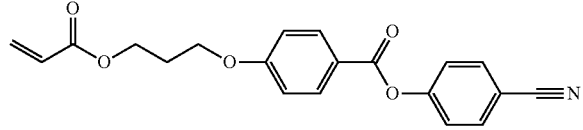

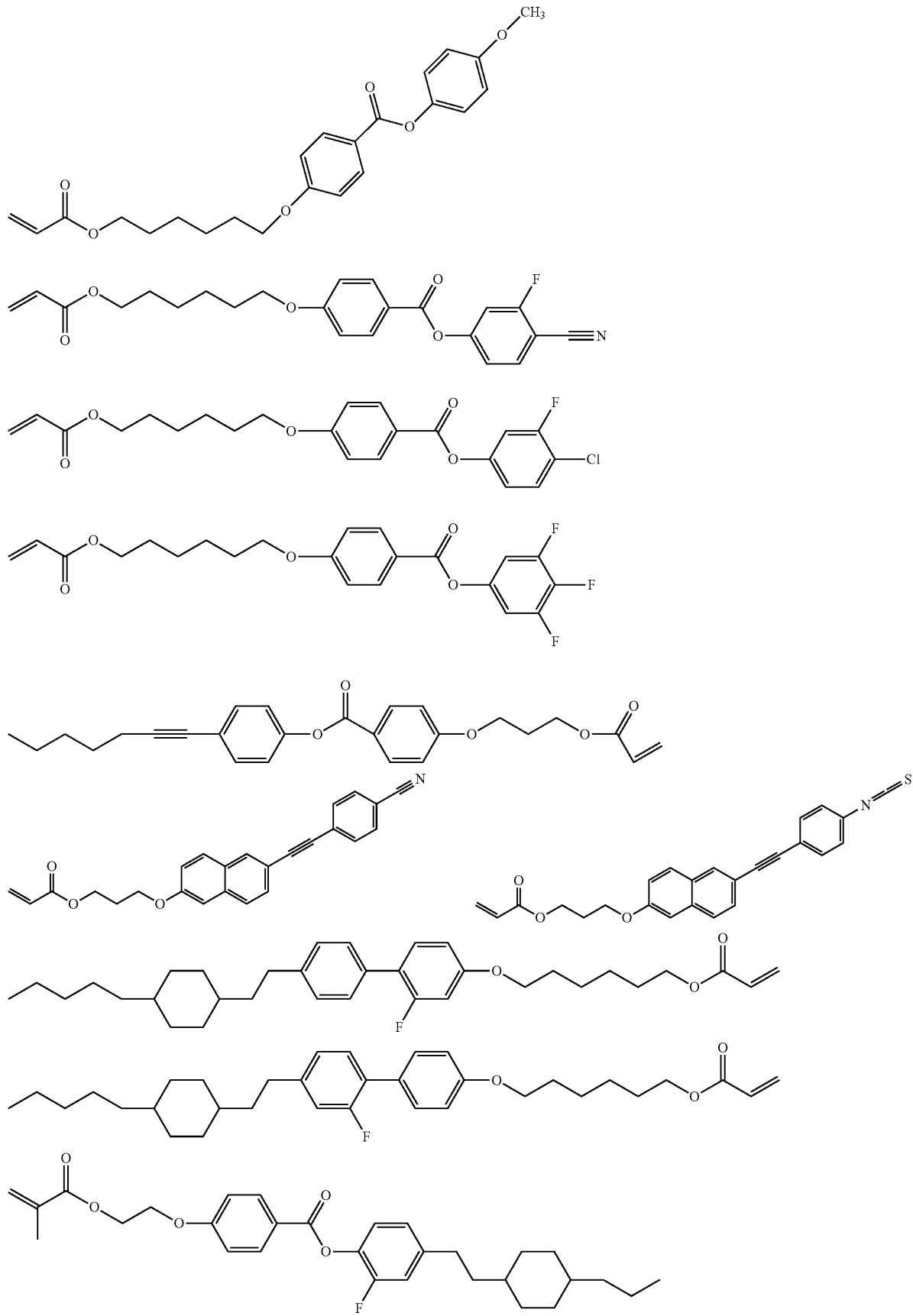

-continued
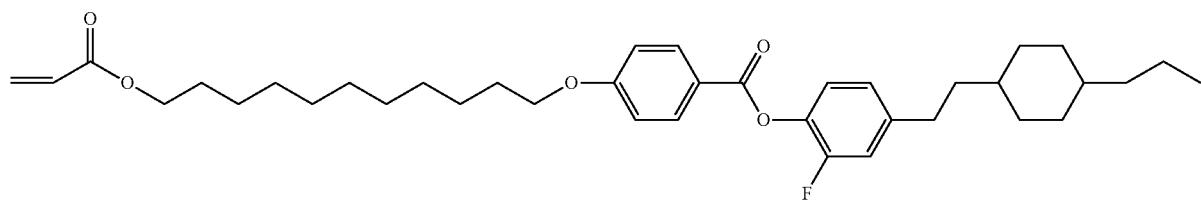
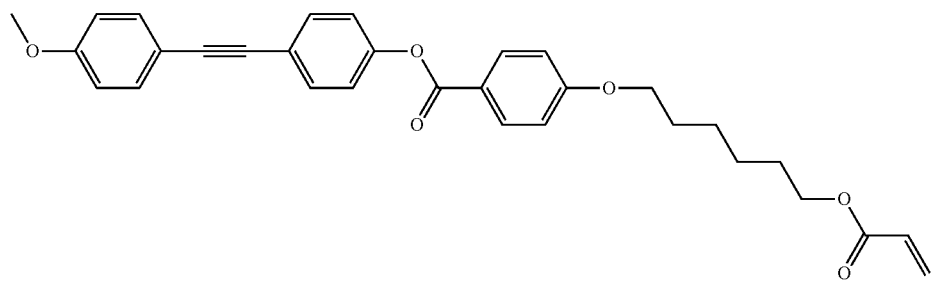
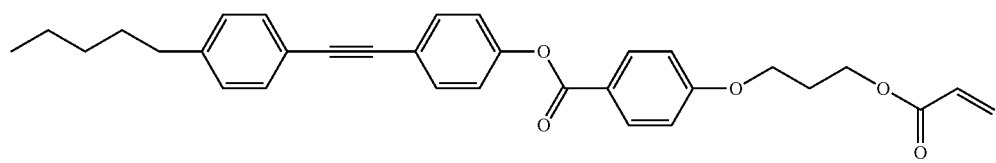
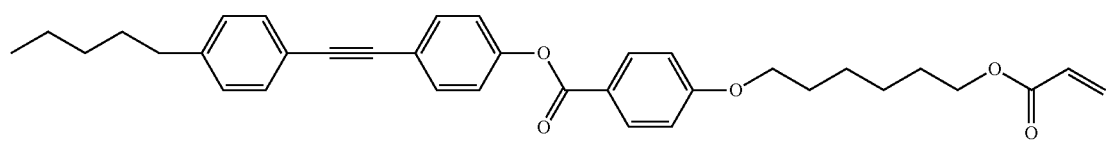
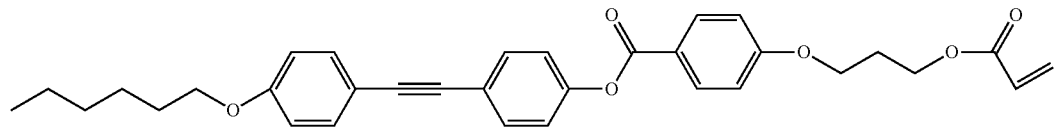
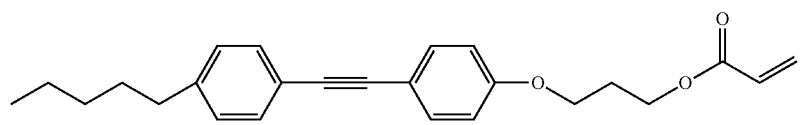
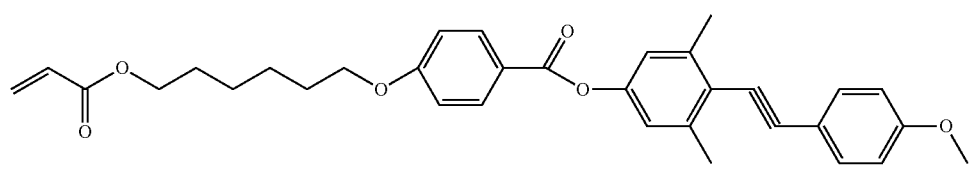
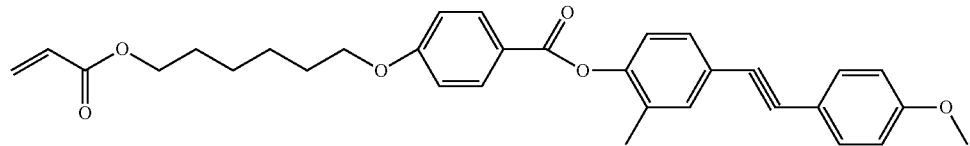
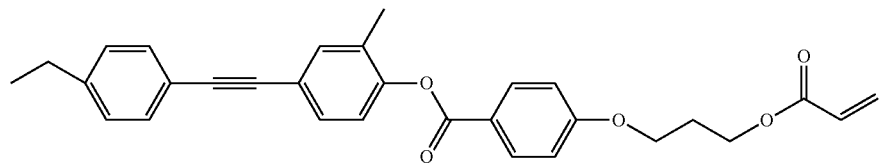

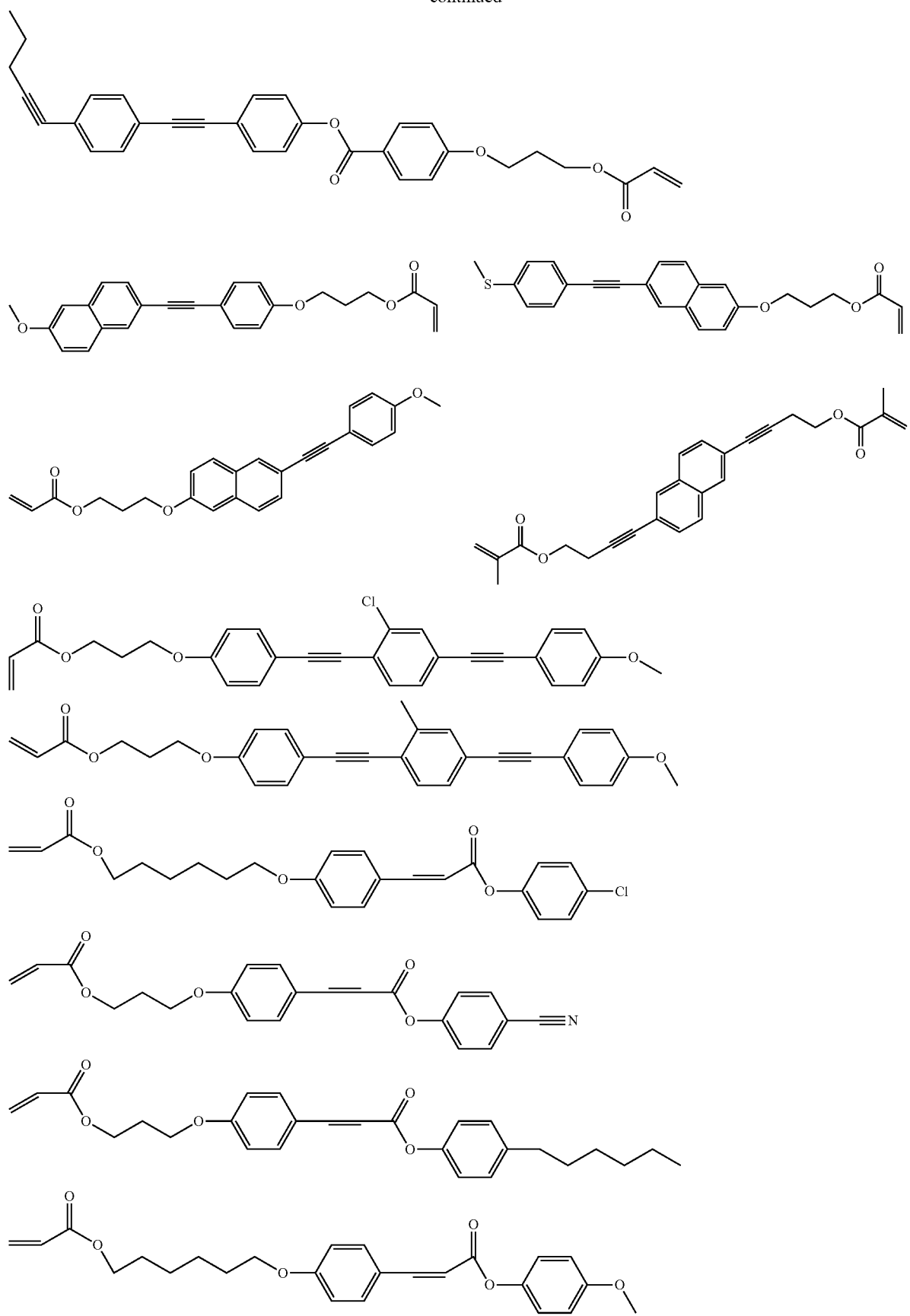

-continued
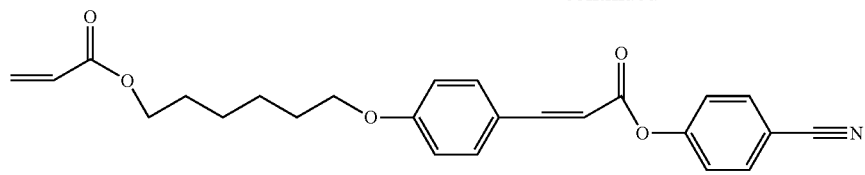
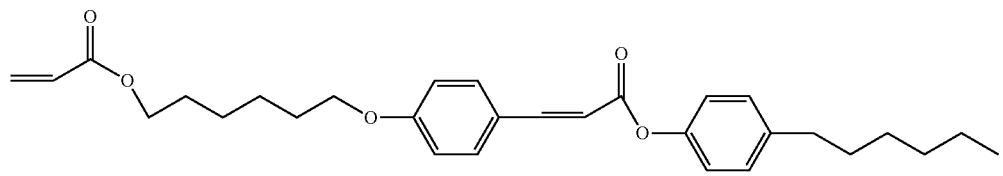
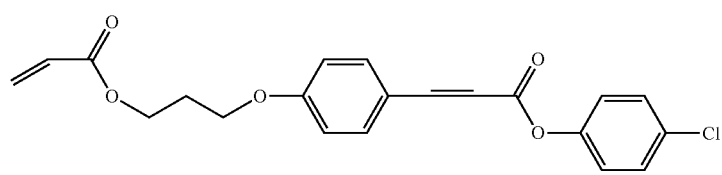
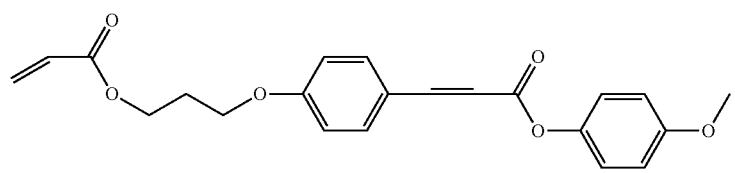
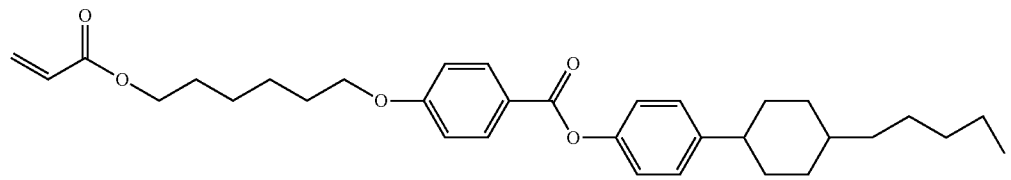
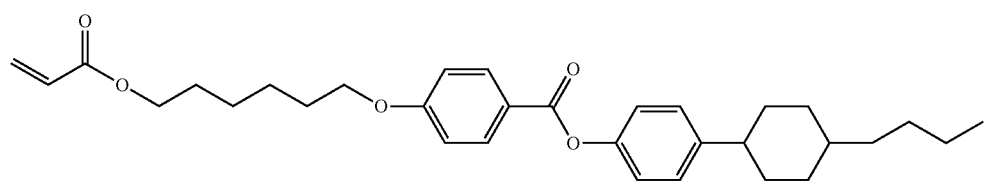
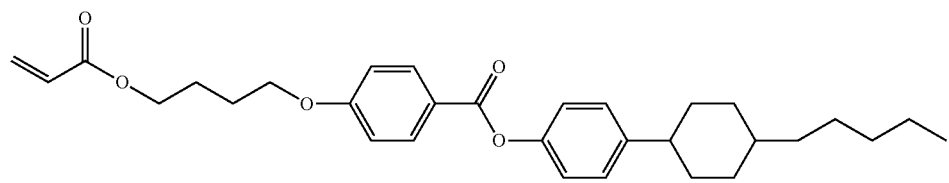
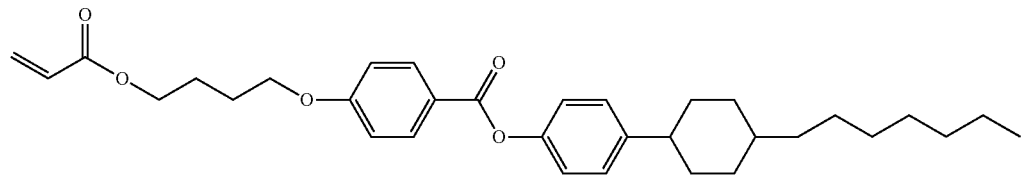
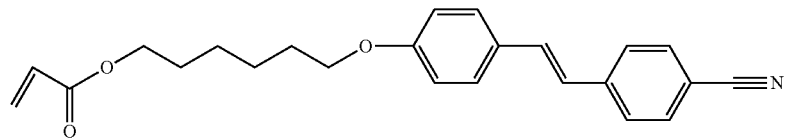

55 56
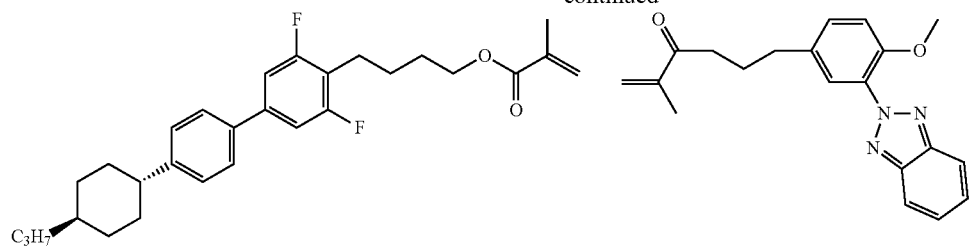
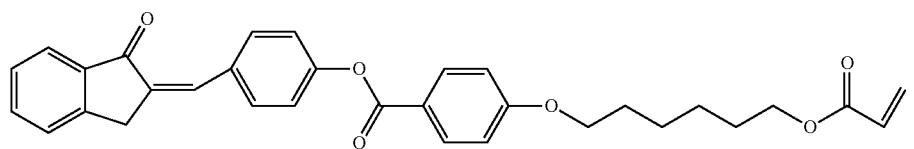
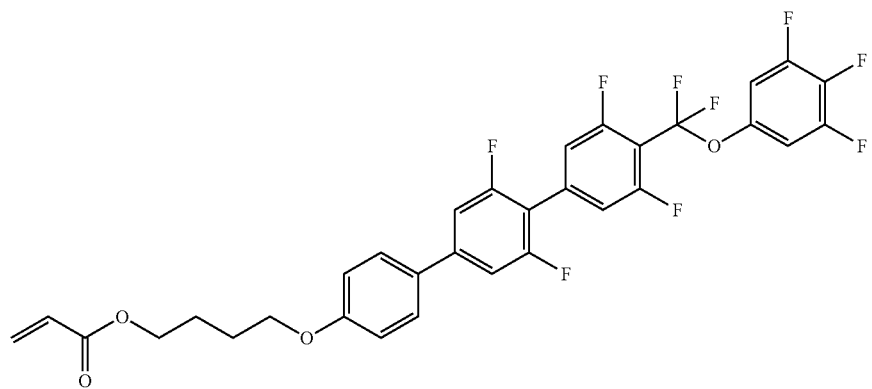
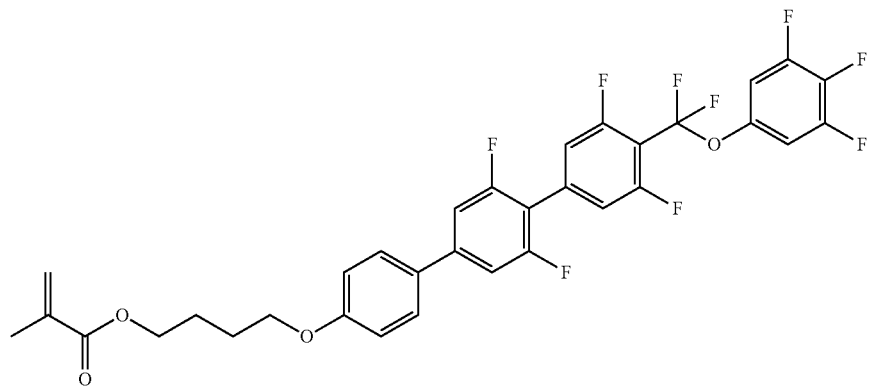
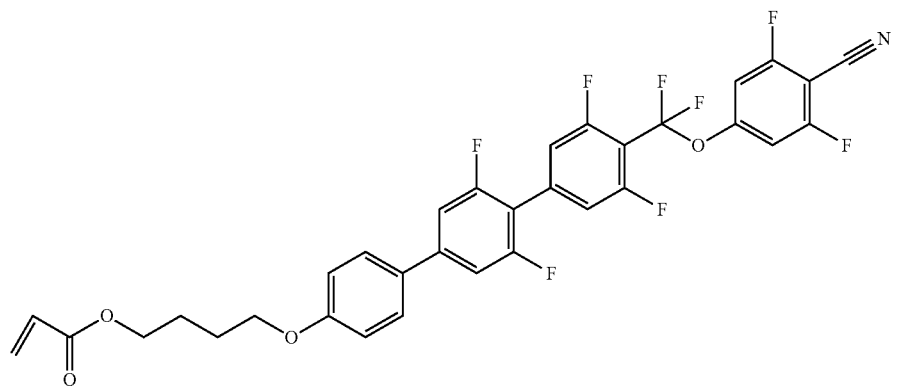

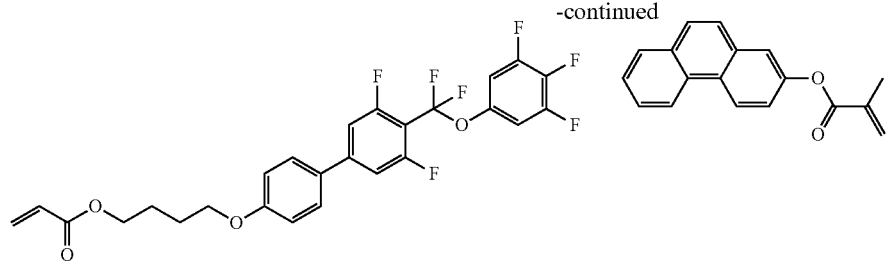
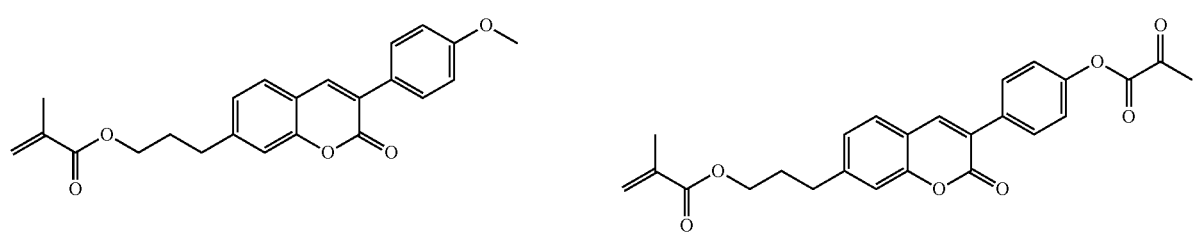
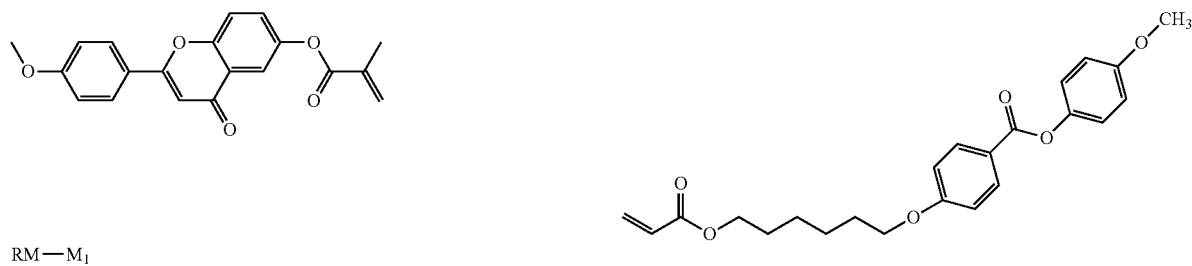
RM—M₁
Particularly preferred monomer compounds of the formula (M-2-1) are depicted below:
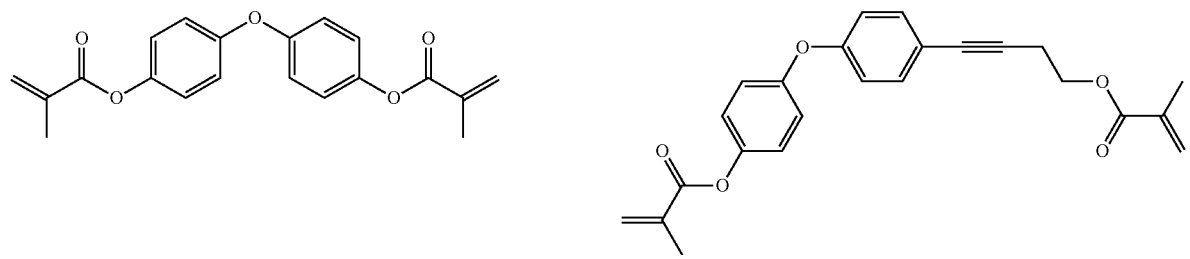
RM-D1
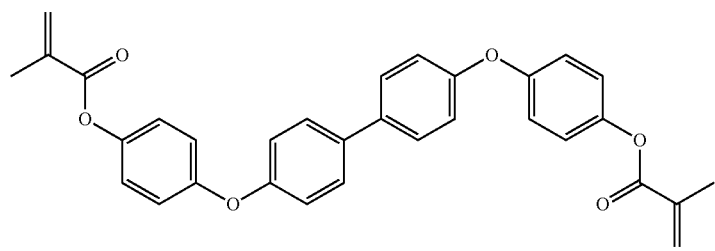

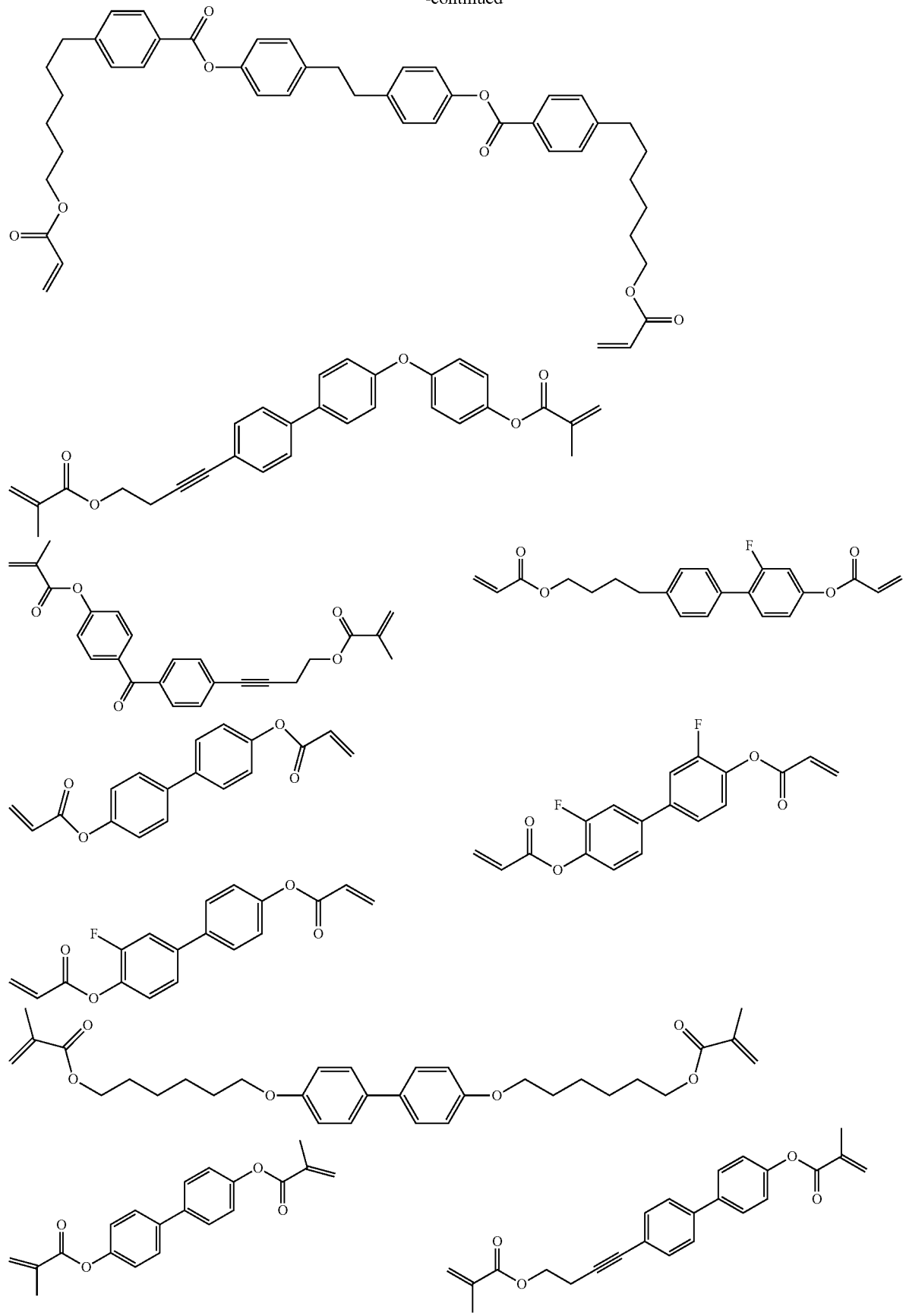

-continued
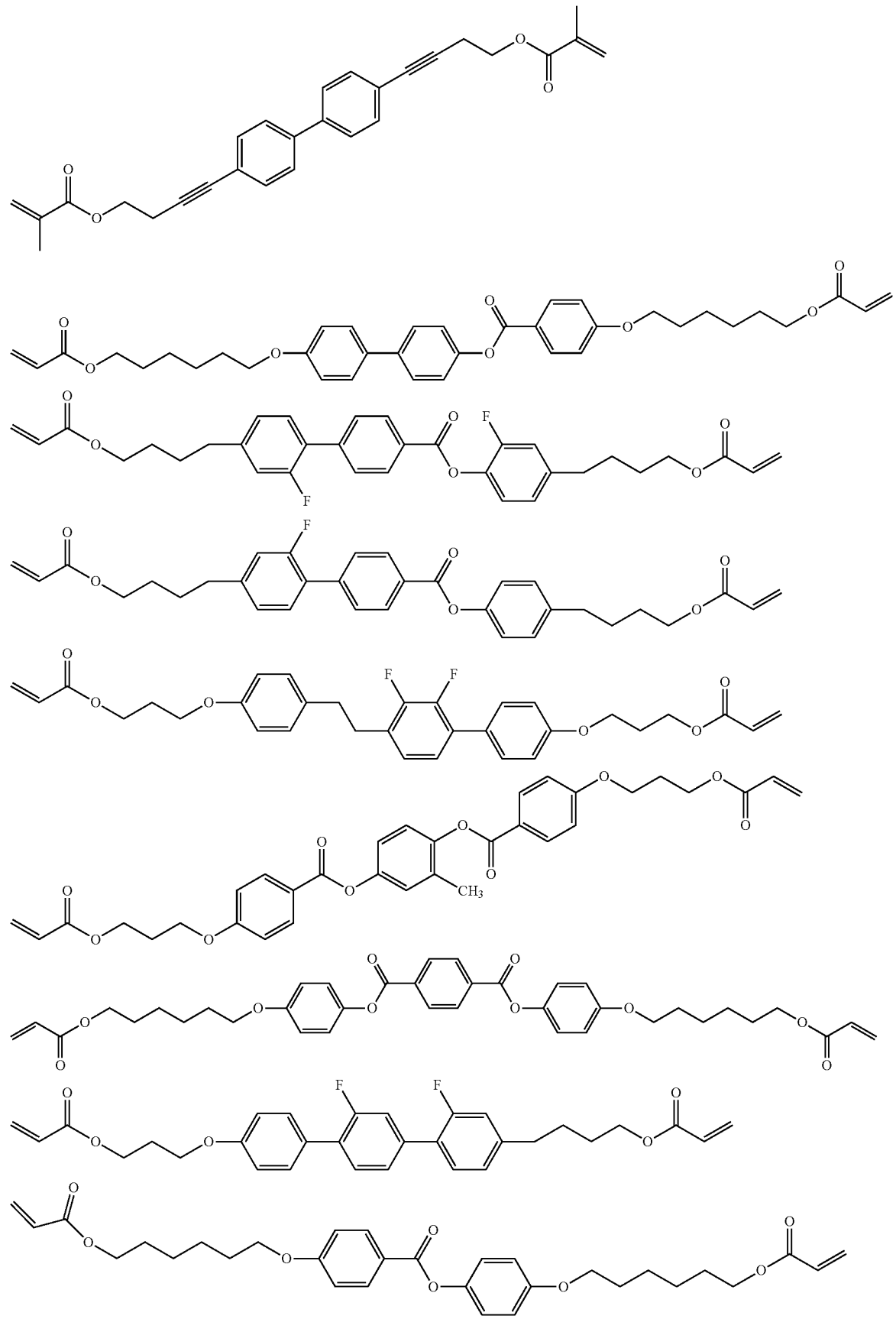

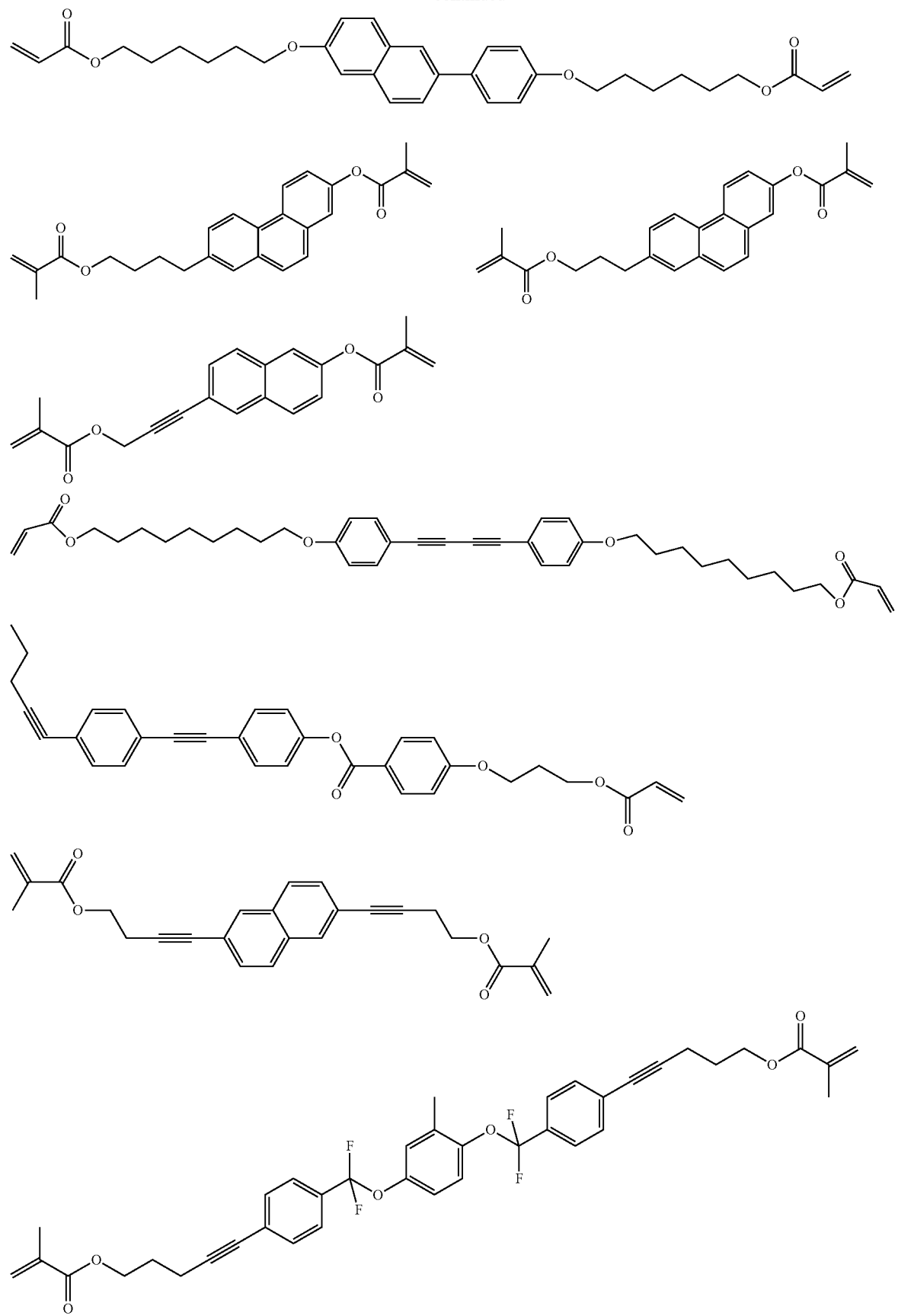

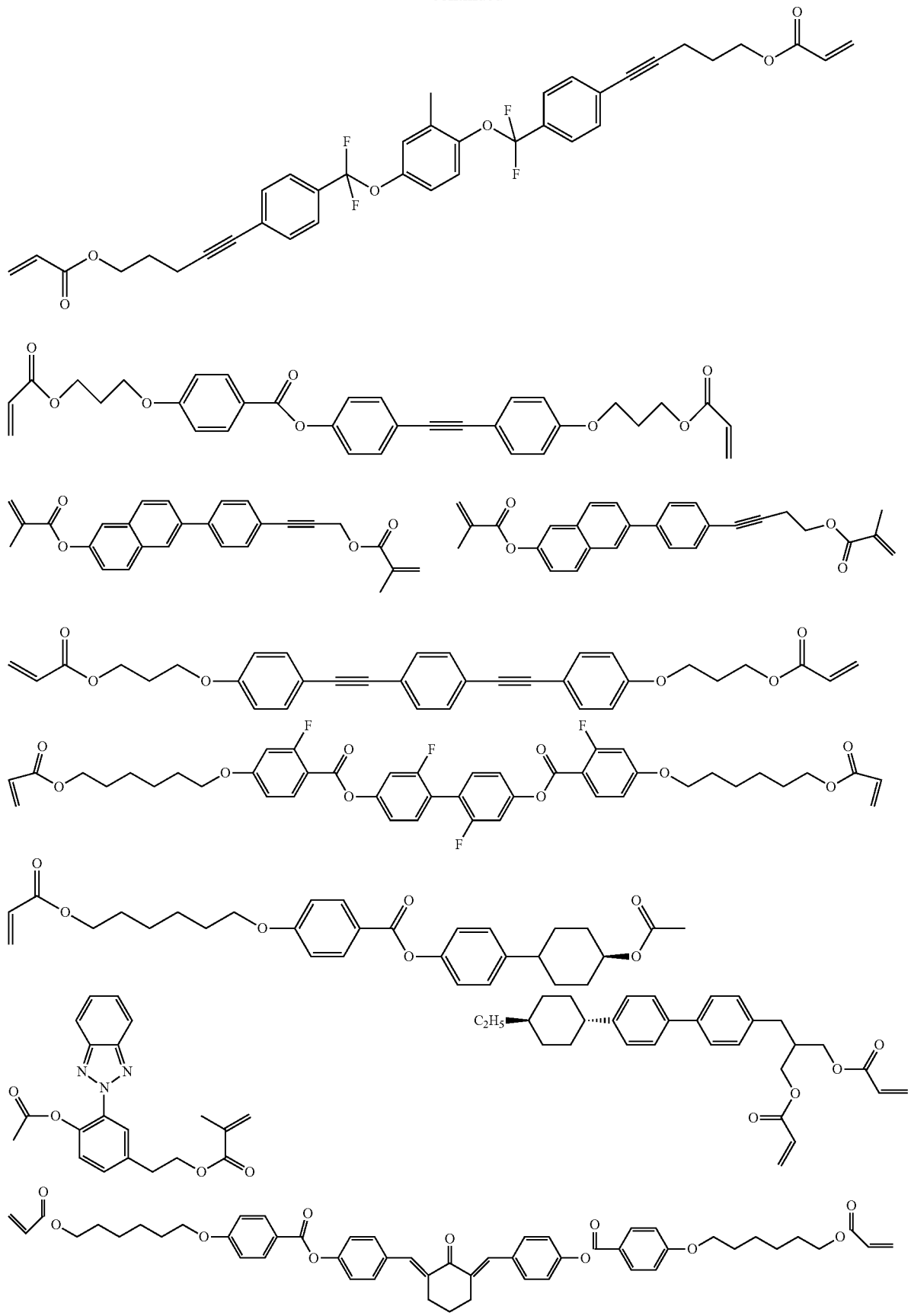

-continued
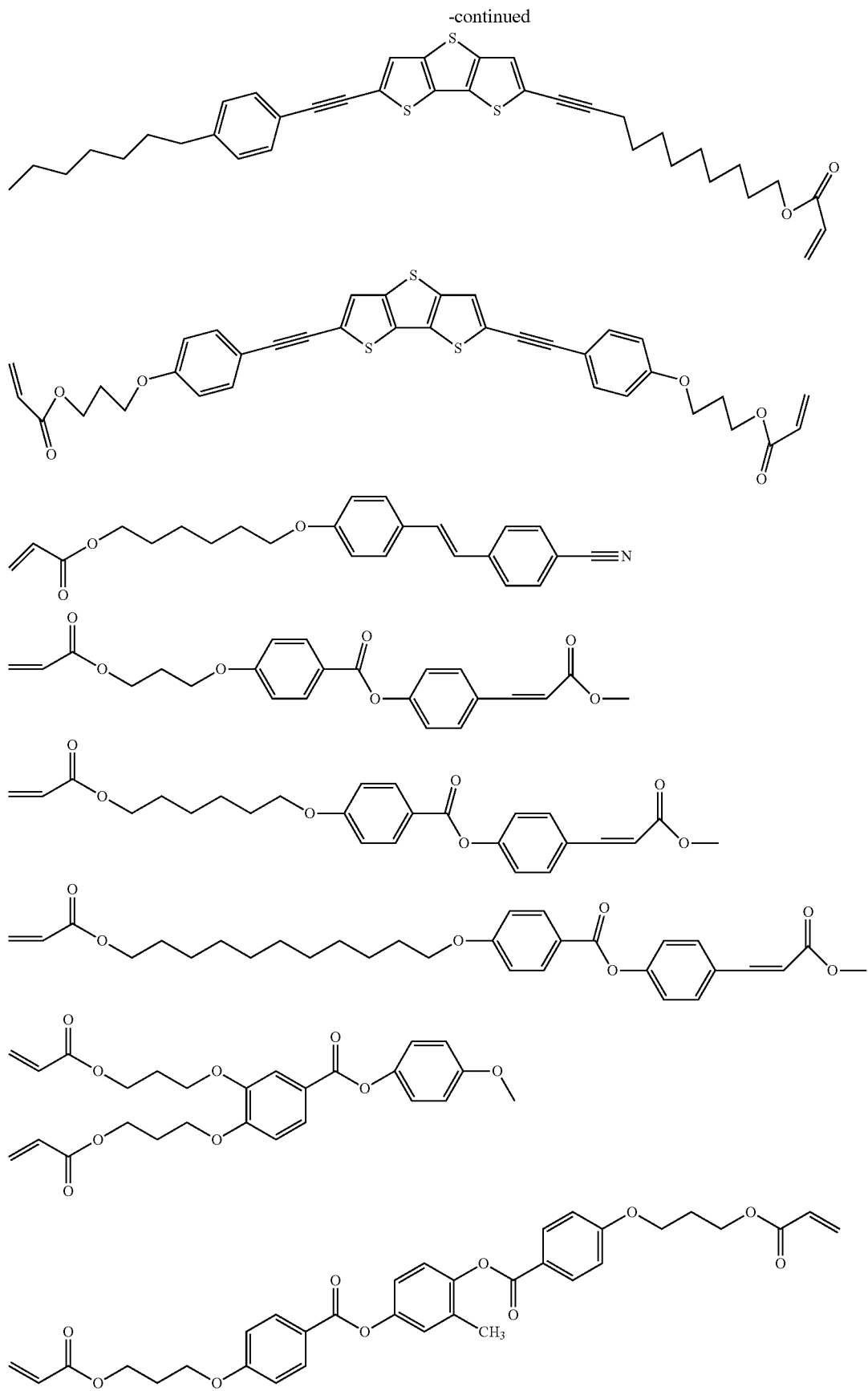

Particularly preferred monomer compounds of the formula (M-1-2) are depicted below:
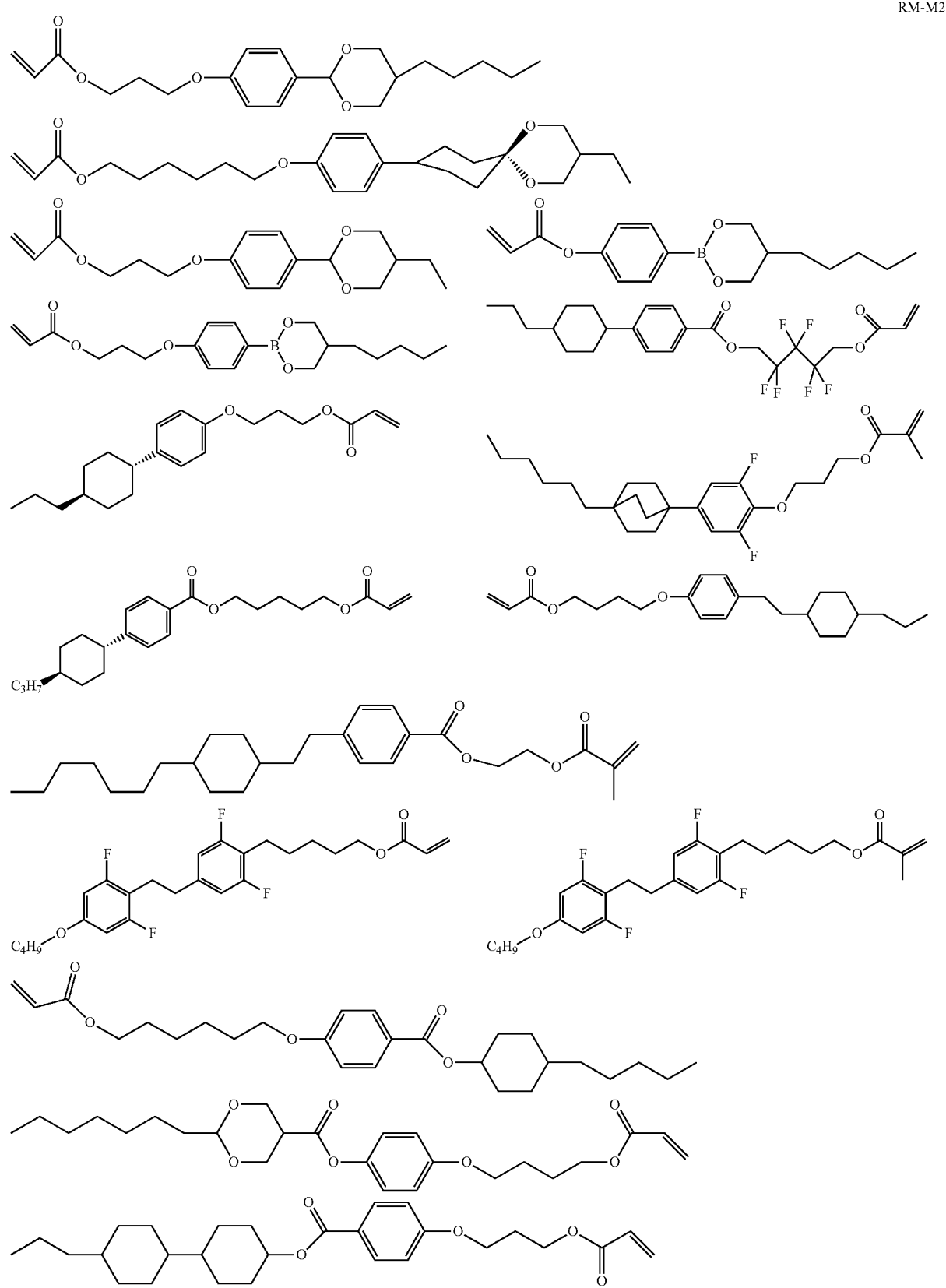
RM-M2

-continued
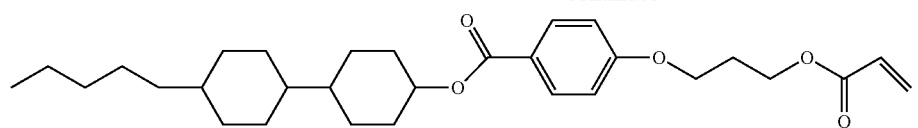
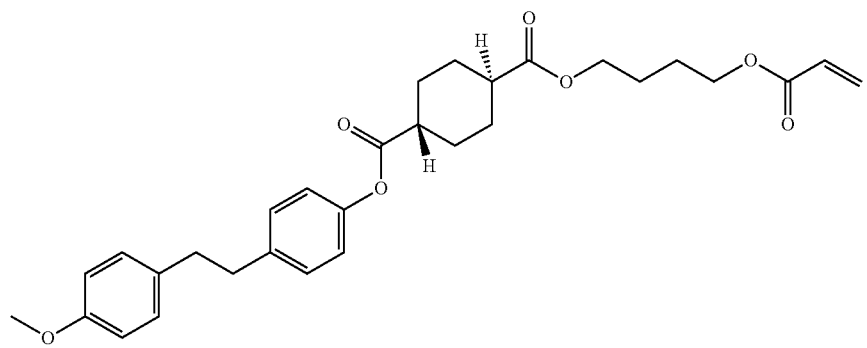
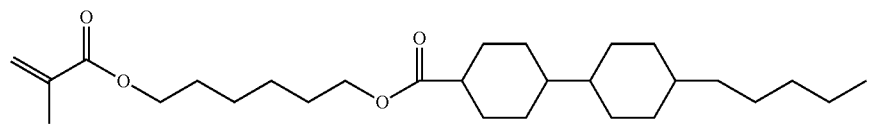
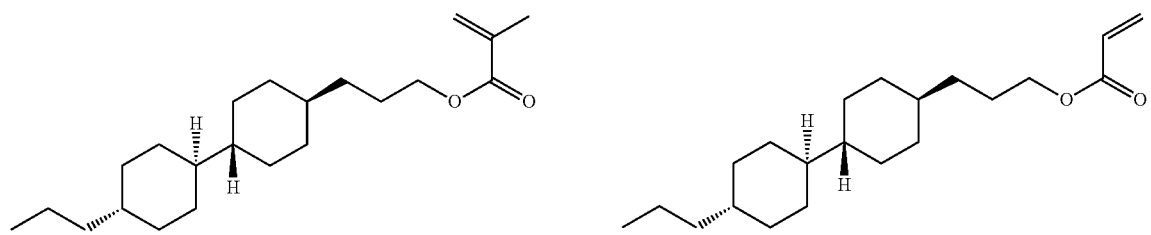
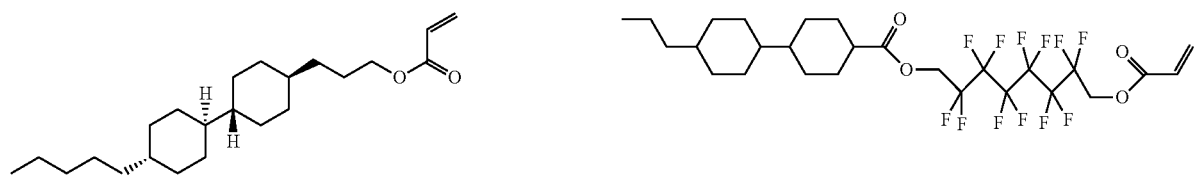
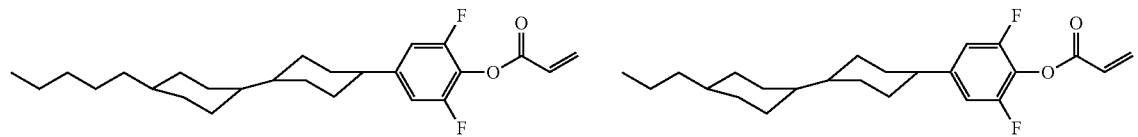
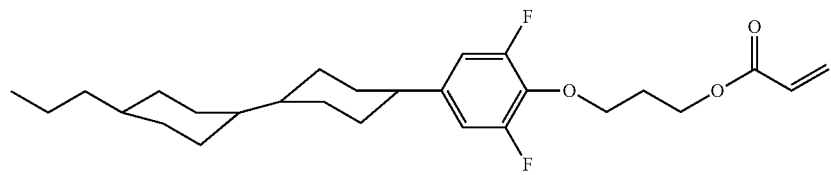
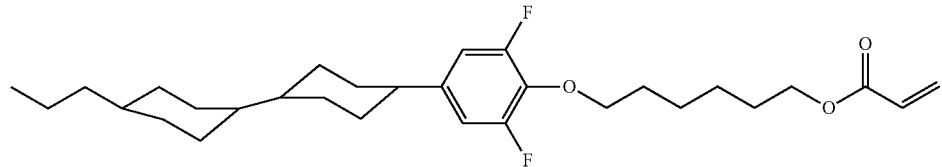

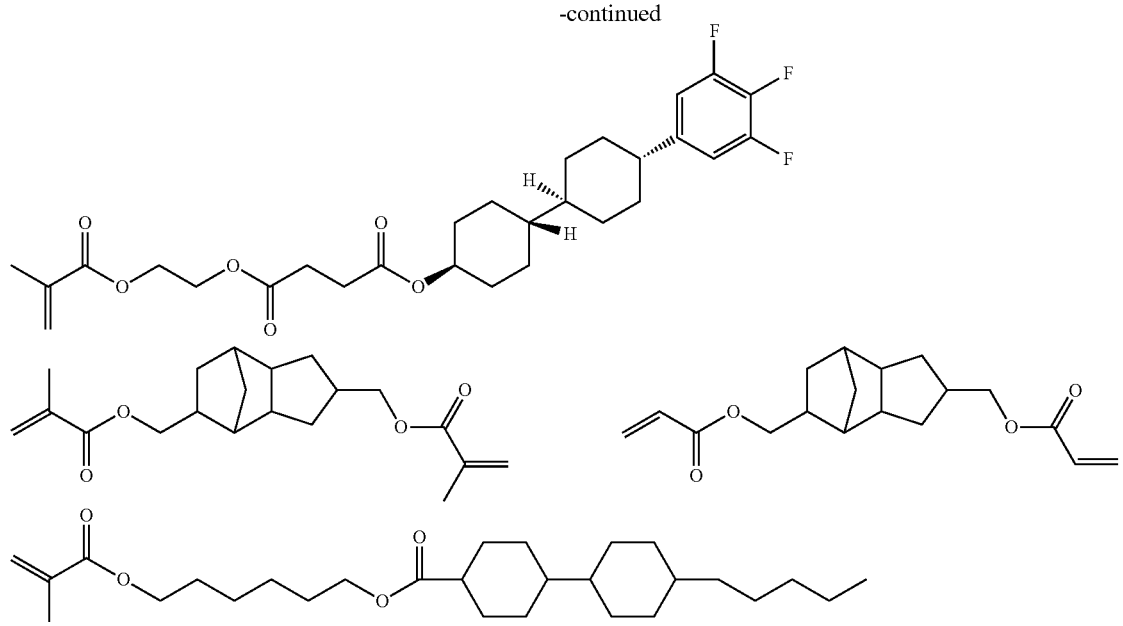
Particularly preferred monomer compounds of the formula (M-2-2) are depicted below:
RM-D2
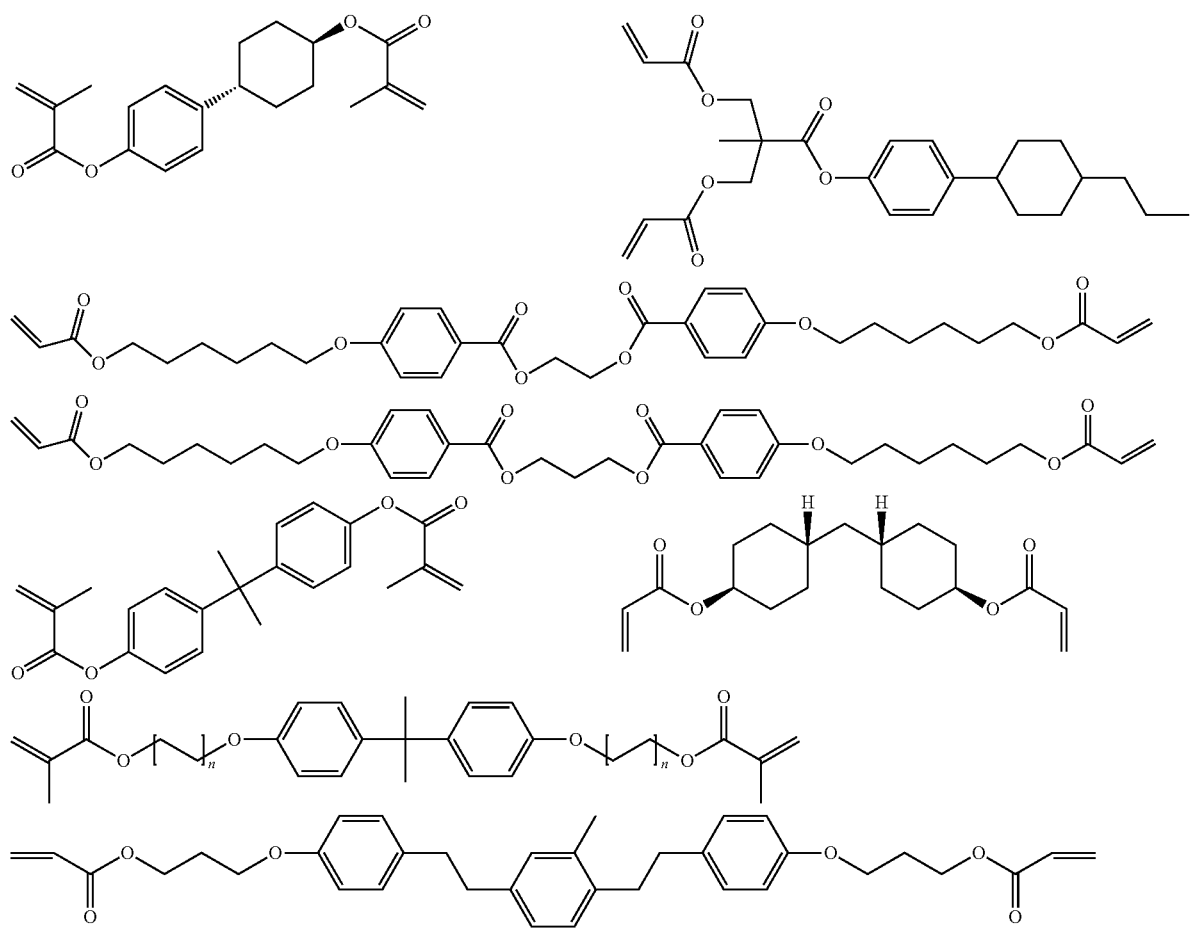

-continued
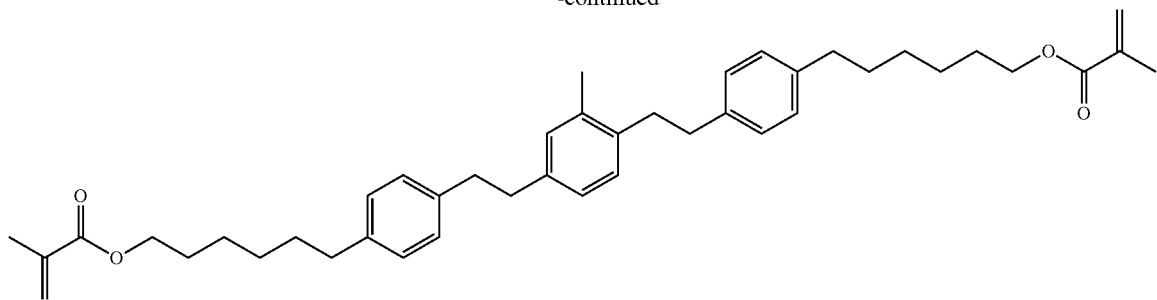
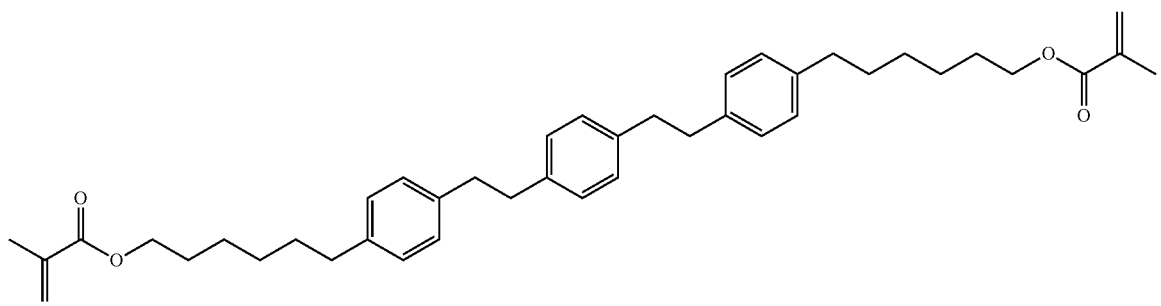
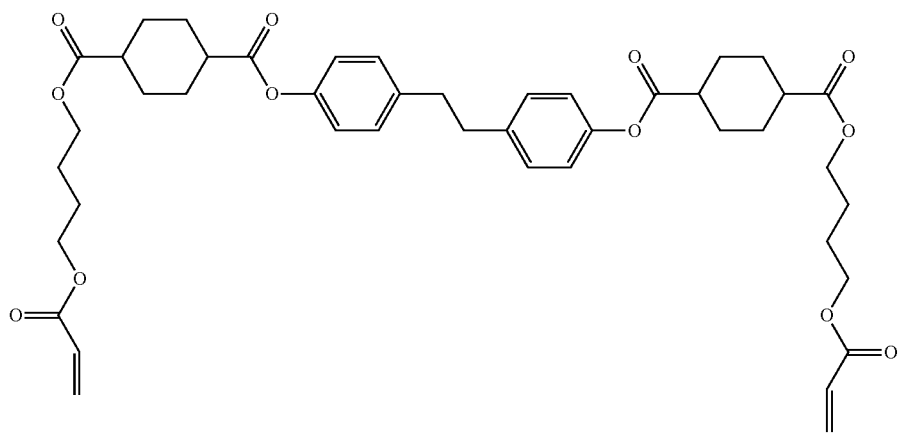
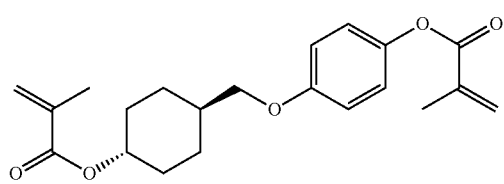
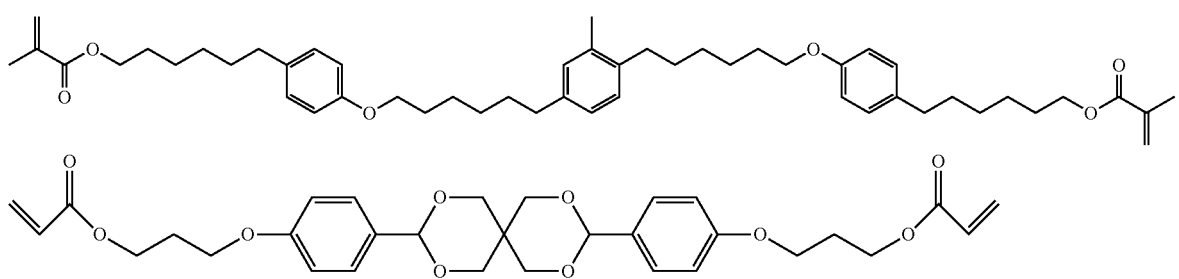

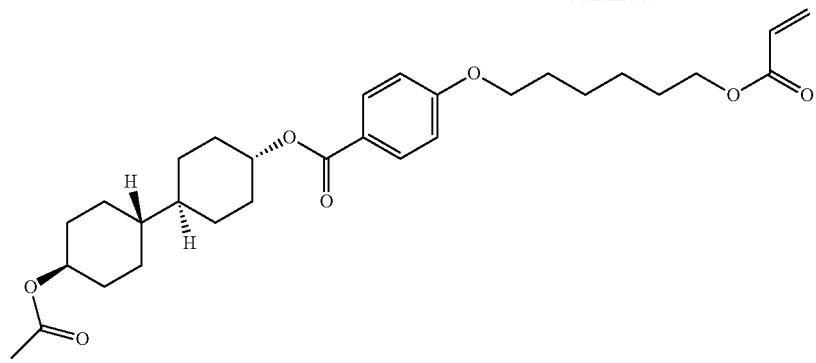
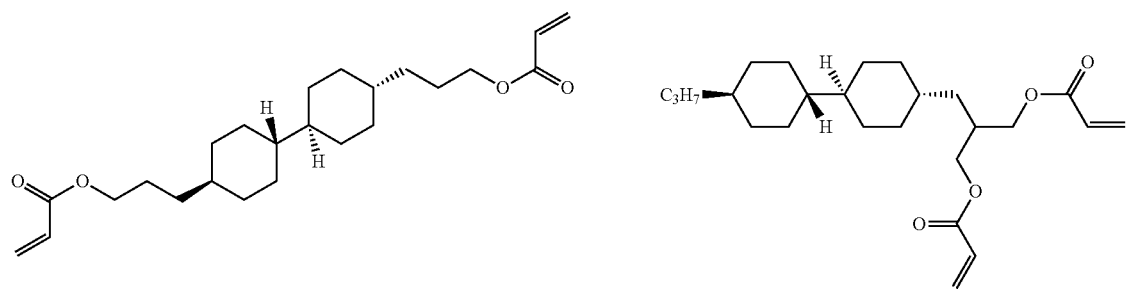
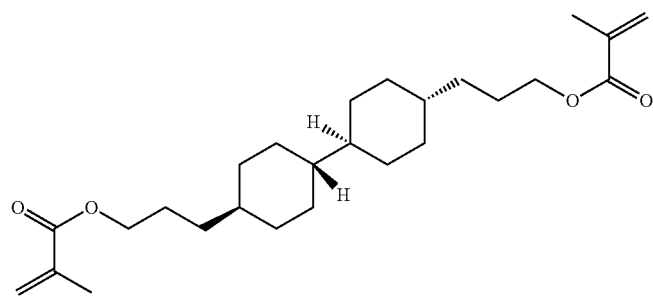
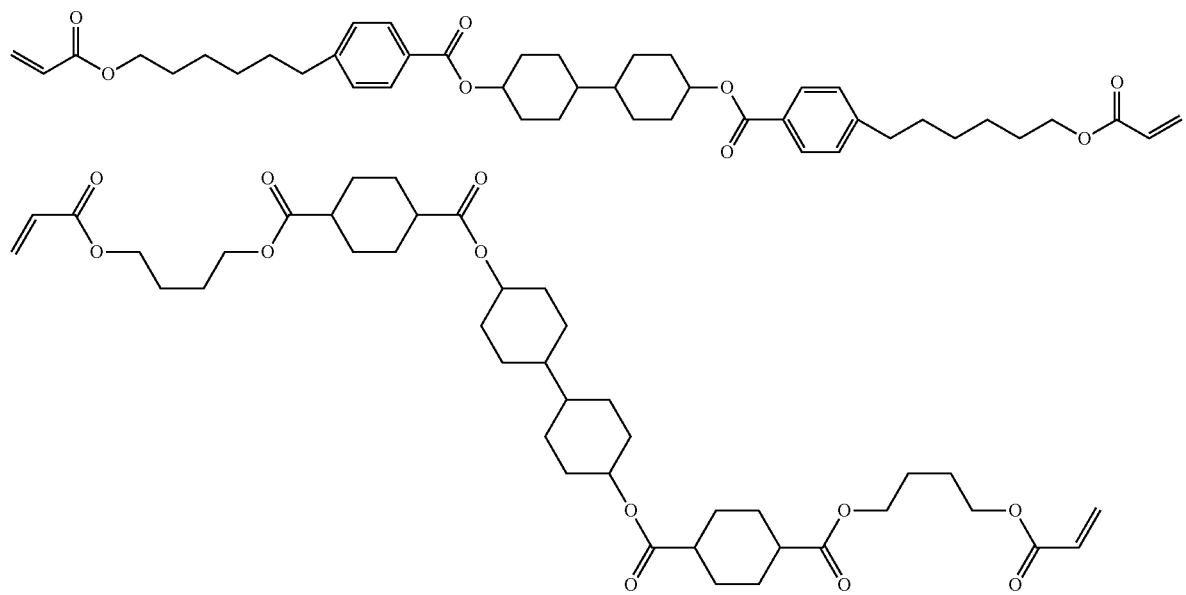

-continued
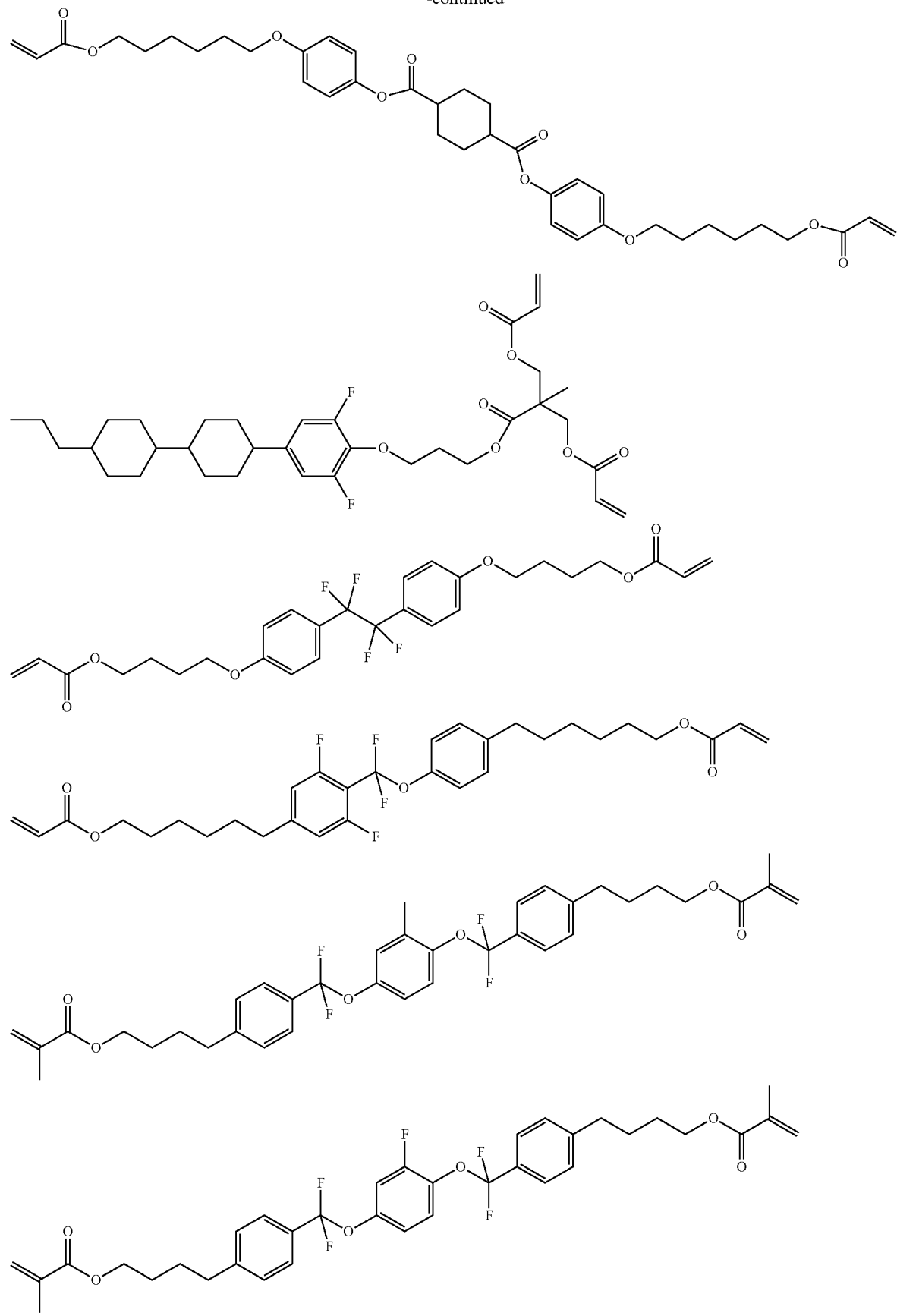

-continued

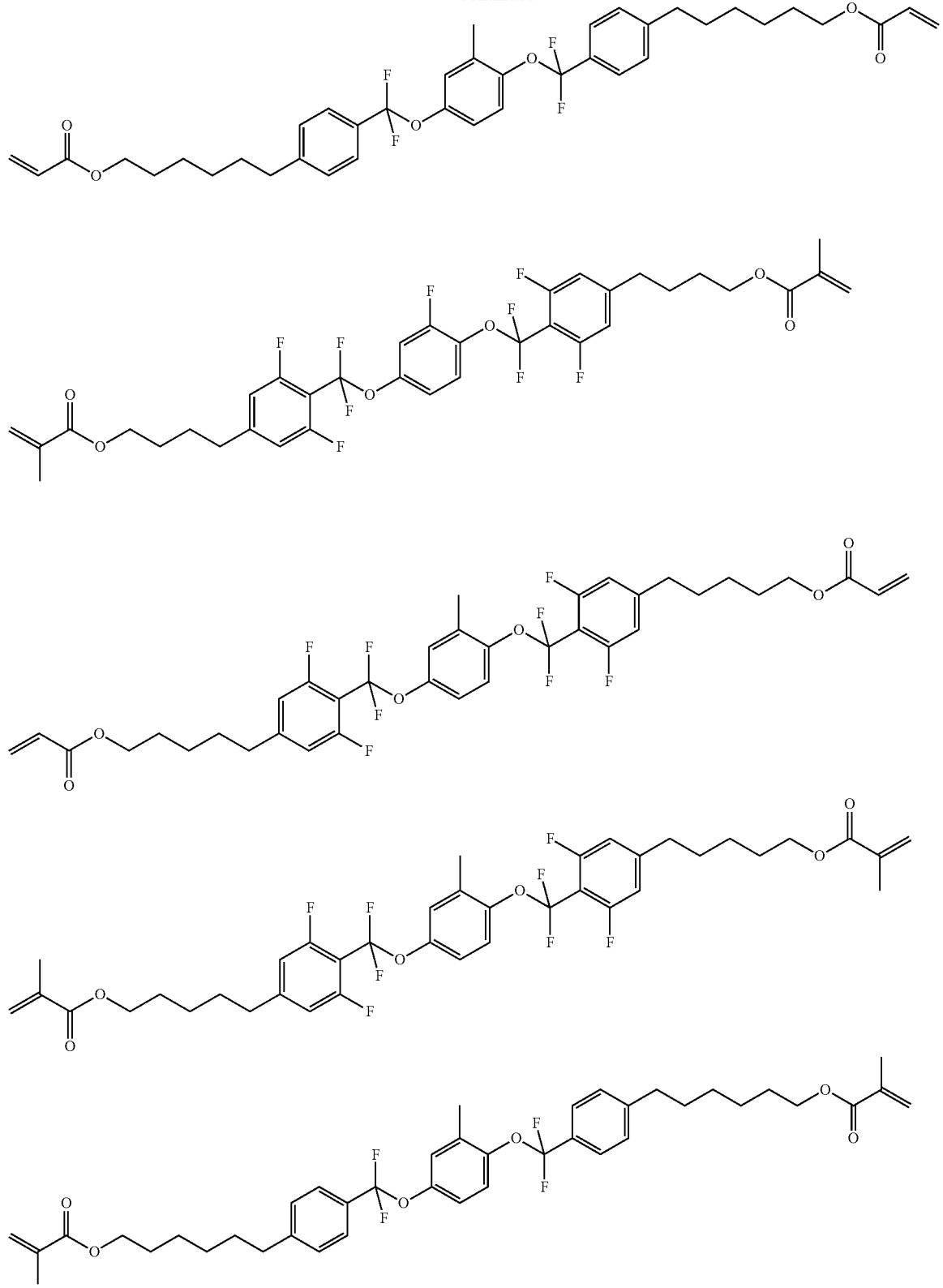

It may also be preferred also to employ monomers which contain no mesogenic groups besides the above-mentioned monomers of the formula (M-1) or (M-2). Such monomers may contain one or more reactive groups, preferably acrylate groups, vinyl ether groups or epoxide groups. They particularly preferably contain one, two, three or four acrylate groups. Preferred monomer compounds of this type are depicted in the following table:

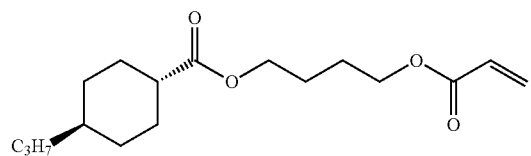
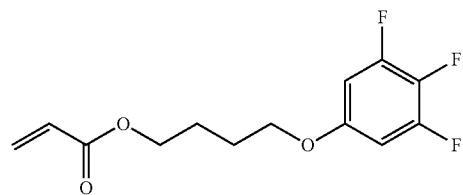 [SMILES: C=CC(=O)OCCCCOc1cc(F)c(F)c(F)c1]
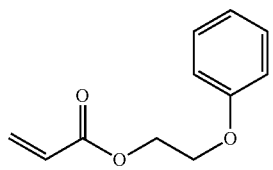
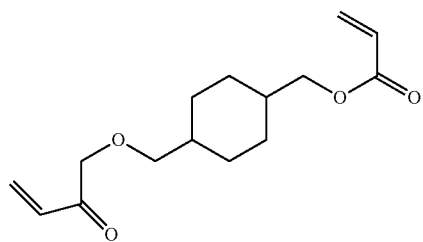 [SMILES: C=CC(=O)COCC1CCC(COC(=O)C=C)CC1]
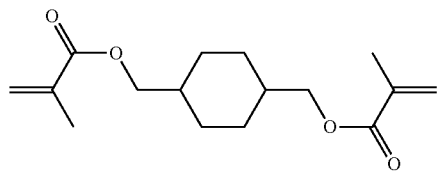 [SMILES: C=C(C)C(=O)OCC1CCC(COC(=O)C(=C)C)CC1]
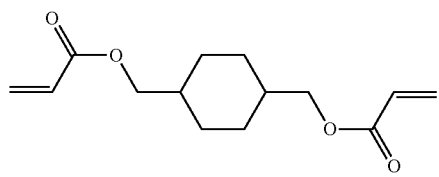 [SMILES: C=CC(=O)OCC1CCC(COC(=O)C=C)CC1]
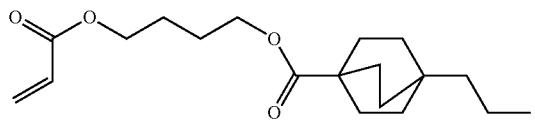 [SMILES: C=CC(=O)OCCCCOC(=O)C12CCC(CCC)(CC1)CC2]
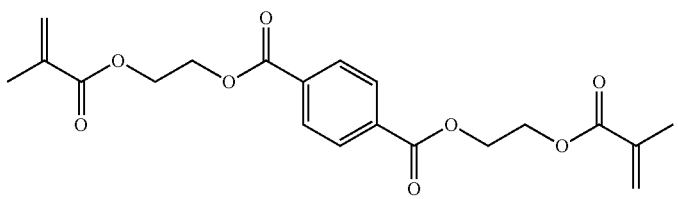 [SMILES: C=C(C)C(=O)OCCOC(=O)c1ccc(C(=O)OCCOC(=O)C(=C)C)cc1]

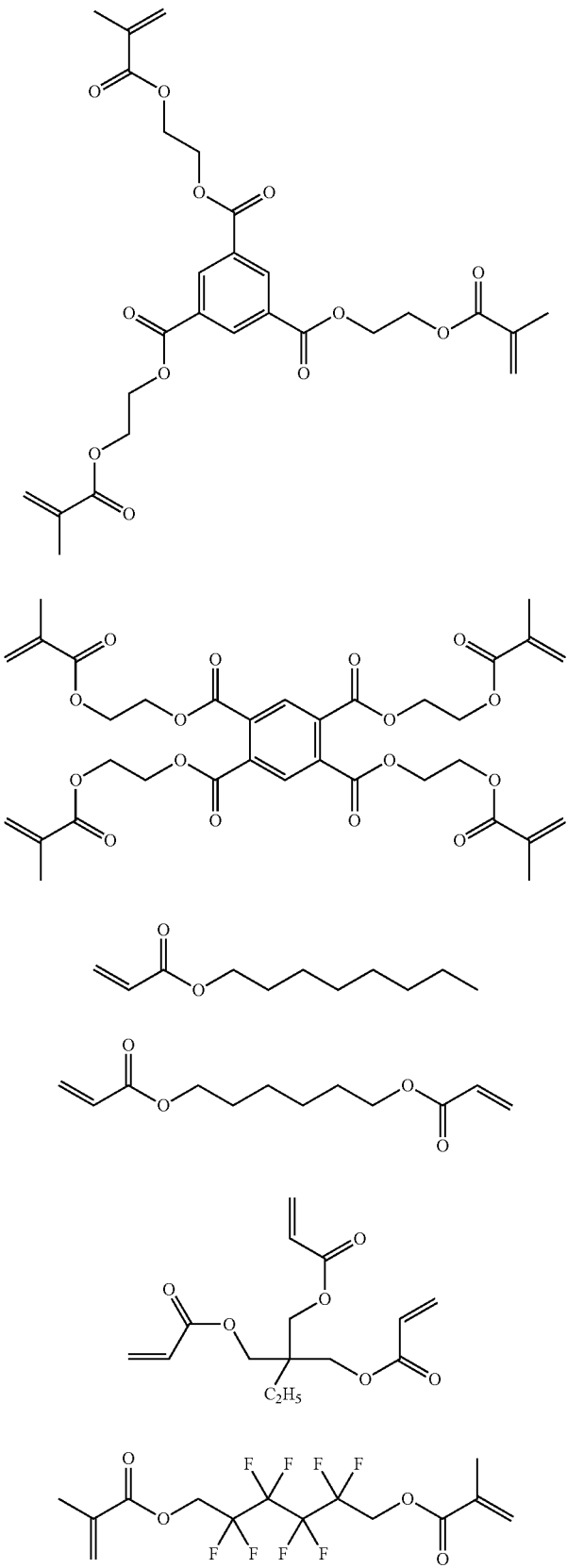

-continued

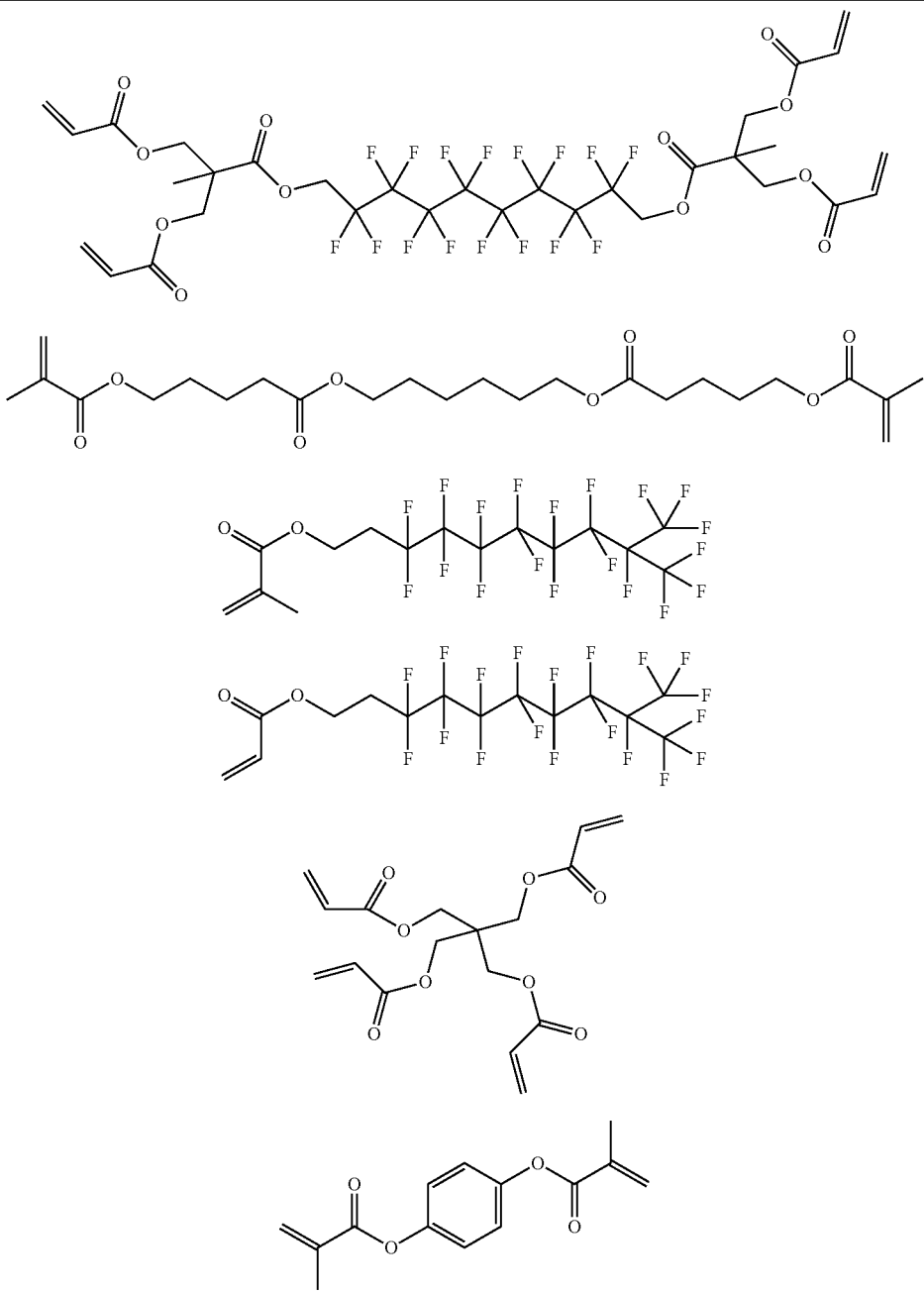

For the production of switching elements according to the invention of type A mentioned above, monofunctional monomers, particularly preferably monomers containing precisely one acrylate group, are preferably employed in a predominant proportion. The proportion of the said preferred monomers is preferably more than 60% of the total amount of monomers employed, particularly preferably more than 80% of the total amount of monomers and very particularly preferably more than 95% of the total amount of monomers.

Monomers of the above-mentioned formula (M-1-2) are very particularly preferably employed in a predominant proportion, and monomers of the formula (M-1-2) in accordance with the above table are even more preferably employed in a predominant proportion.

For the production of switching elements according to the invention of type B mentioned above, multifunctional monomers, particularly preferably monomers containing precisely two acrylate groups, are preferably employed in a predominant proportion. The proportion of the said preferred monomers is preferably more than 40% of the total amount of monomers employed, particularly preferably more than 60% of the total amount of monomers and very particularly preferably more than 80% of the total amount of monomers employed.

Monomers of the above-mentioned formula (M-2-1) or (M-2-2) are very particularly preferably employed in a predominant proportion, and monomers of the formula (M-2-1) in accordance with the above table are even more preferably employed in a predominant proportion.

The mixture of the switching layer, comprising at least one liquid-crystalline compound and at least one polymer, can be prepared in various ways.

Preference is given to an embodiment in which the polymer is prepared by a polymerisation reaction of at least one monomer compound in the presence of the liquid-crystalline compound (in-situ process).

Polymerisation in the presence of the liquid-crystalline compound here is taken to mean, in particular, that a mixture comprising at least one liquid-crystalline compound and at least one monomer compound is prepared, and that the polymerisation reaction, in which the at least one monomer compound reacts to form a polymer, is carried out subsequently. The said polymer is in this case present in the mixture together with the at least one liquid-crystalline compound after completion of the polymerisation reaction. The resultant mixture can be used directly for the production of the switching layer or subjected to further processing steps.

The invention therefore furthermore relates to the use of a mixture comprising at least one liquid-crystalline compound and at least one monomer compound for the production of the switching element according to the invention.

Preference is given to the use of the mixture comprising at least one liquid-crystalline compound and at least one monomer compound for the production of the switching element according to the invention, where the mixture is characterised in that it comprises at least one monomer compound which represents a monoacrylate and at least one monomer compound which represents a diacrylate.

The monomer compound which represents a monoacrylate is preferably selected here from compounds of the formula (M-1) shown above, particularly preferably from compounds of the formulae (M-1-1) and (M-1-2) shown above. Very particular preference is given to the explicit compounds of the formulae (M-1-1) and (M-1-2) shown above.

The monomer compound which represents a diacrylate is preferably selected here from compounds of the formula (M-2) shown above, particularly preferably from compounds of the formulae (M-2-1) and (M-2-2) shown above. Very particular preference is given to the explicit compounds of the formulae (M-2-1) and (M-2-2) shown above.

The polymerisation reaction of the at least one monomer compound in which the at least one polymer is obtained in a mixture with the at least one liquid-crystalline compound is preferably a UV light-induced polyaddition.

The above-mentioned mixture comprising at least one liquid-crystalline compound and at least one monomer compound preferably additionally comprises at least one photoinitiator compound. The at least one photoinitiator compound is preferably present in the mixture in a concentration of 0.01% to 2% and particularly preferably in a concentration of 0.1% to 1%.

Preferred photoinitiator compounds in accordance with the present invention are depicted in the following table:

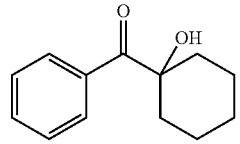 [SMILES: O=C(c1ccccc1)C1(O)CCCCC1]

-continued

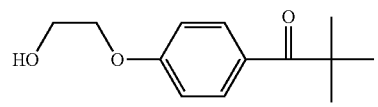 [SMILES: CC(C)(C)C(=O)c1ccc(OCCO)cc1]

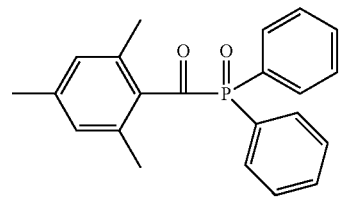 [SMILES: Cc1cc(C)c(C(=O)P(=O)(c2ccccc2)c2ccccc2)c(C)c1]

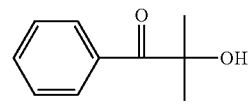

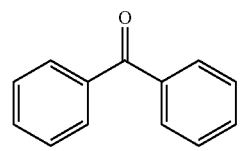 [SMILES: O=C(c1ccccc1)c1ccccc1]

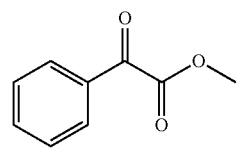

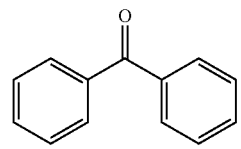

+

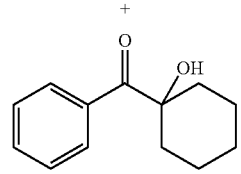

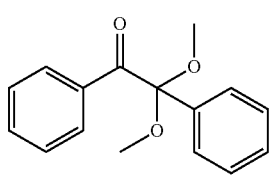

Irgacure 651

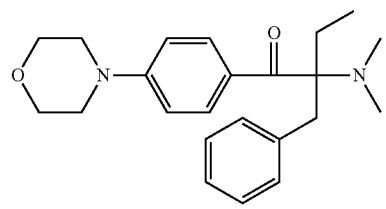

-continued

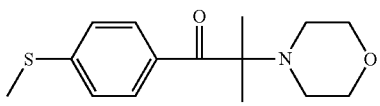

Irgacure 907

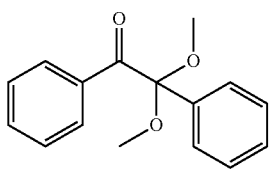

+

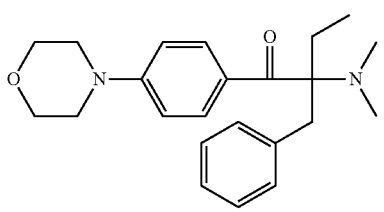 [SMILES: CCC(Cc1ccccc1)(C(=O)c1ccc(N2CCOCC2)cc1)N(C)C]

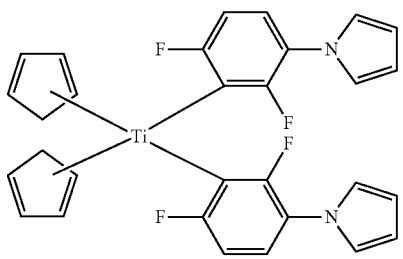

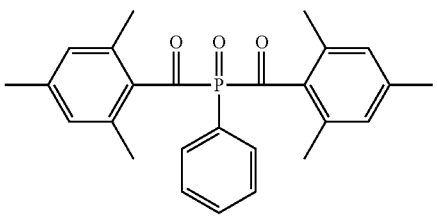

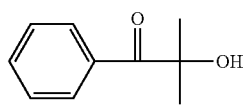

+

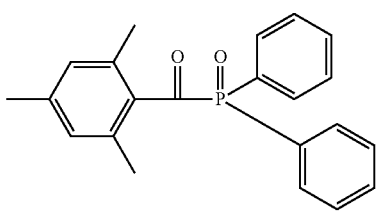

-continued

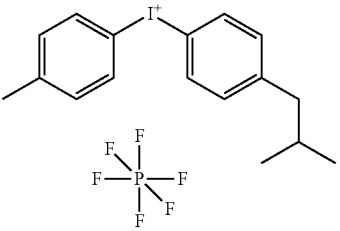

Preferred illumination systems for the initiation of the polymerisation reaction of the monomers are mercury-based illumination systems, for example H, F and G emitters. Particular preference is given to F emitters or other illumination systems having a low UV-B content and a high UV-A content. Preference is given to the use of a filter which blocks light having a wavelength of less than 320 nm, preferably less than 340 nm and particularly preferably less than 360 nm.

Furthermore, the above-mentioned mixture comprising at least one liquid-crystalline compound and at least one monomer compound additionally comprises at least one compound which acts as chain-transfer agent. Chain-transfer agents react with the polymer free radical in the polymerisation reaction to give a free radical and a saturated polymer, which does not react further. The chain-transfer agent free radical formed is capable of initiating a new polymerisation reaction. The use of chain-transfer agents enables, inter alia, the molecular weight of the polymers obtained in the polymerisation reaction to be controlled.

The chain-transfer agents are preferably present in the mixture in a concentration of 0.1% to 10%, particularly preferably 1% to 8%. The concentration of these compounds and other components present in relatively small amounts is disregarded when specifying the concentrations of the liquid-crystalline compounds and the polymer.

Chain-transfer agents which are preferably used in accordance with the present invention contain at least one C-halogen, S—H, Si—H or S—S bond. Particularly preferred chain-transfer agents are selected from the group comprising the following compound:

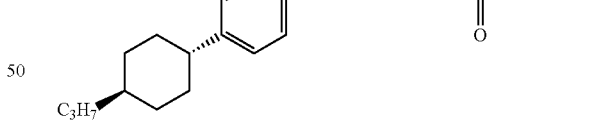

and 2-(dodecylthiocarbonothioylthio)-2-methylpropionic acid, 2-cyano-2-propyl 4-cyanobenzodithioate, 2-cyano-2-propyl benzodithioate, 2-cyano-2-propyl dodecyltrithiocarbonate, 2-cyanopropan-2-yl N-methyl-N-(pyridin-4-yl)carbamodithioate, 2-phenyl-2-propyl benzodithioate, 4,4'-thiobis-benzenethiol, 4-cyano-4-(phenylcarbonothioylthio) pentanoic acid, 4-cyano-4-[(dodecylsulfanylthiocarbonyl) sulfanyl]pentanoic acid, bis(dodecylsulfanylthiocarbonyl) disulfide, bis(thiobenzoyl) disulfide, bromotrichloro-methane, cyanomethyl dodecyltrithiocarbonate, cyanomethyl methyl-(phenyl)carbamodithioate, isooctyl 3-mercaptopropionate, methyl 2-(dodecylthiocarbonothioylthio)-2-methylpropionate, methyl 2-propionate methyl(4-pyridinyl)carbamodithioate, N,N'-dimethyl-N,N'-di(4-pyridinyl)-thiuram disulfide, pentaerythritol tetrakis(2-mercaptoacetate), pentaerythritol tetrakis(3-mercaptopropionate) and trimethylolpropane tris(3-mercaptopropionate).

An alternative and likewise preferred embodiment is one in which the polymer is prepared by a polymerisation reaction of at least one monomer compound, where the switching layer comprising the liquid-crystalline compound and the polymer is subsequently produced by mixing the polymer and the liquid-crystalline compound (two-step process).

The invention thus also relates to the use of a mixture comprising at least one liquid-crystalline compound and at least one polymer obtained by a polyaddition reaction for the production of the switching element according to the invention.

According to this embodiment (two-step process), a polymerisation reaction of the at least one monomer compound is carried out, as stated above, without the at least one liquid-crystalline compound simultaneously being present in the mixture. The polymerisation is preferably carried out in a solvent which is typically used for polymerisation reactions, particularly preferably in THF, toluene, butyrolactone or NMP. After the polymerisation, the solvent is removed and the polymer is mixed with the at least one liquid-crystalline compound. The resultant mixture can be used directly for the production of the switching layer or subjected to further processing steps.

For the preparation of the polymer, analogous processes as in the case of in-situ processes can be used in the two-step process, for example a UV light-induced polyaddition reaction. However, owing to the different boundary conditions in this process, it is also possible to employ different preparation processes for the polymer.

Especially suitable and adapted for use for the production of the switching element according to the invention is a mixture comprising at least one liquid-crystalline compound, at least one monomer compound which represents a monofunctional compound, preferably a monoacrylate compound, and at least one monomer compound which represents a multifunctional compound, preferably a diacrylate compound, where at least one monomer compound contains one or more mesogenic groups. The present invention therefore likewise relates to a mixture of this type.

The monomer compounds here can have high values for the birefringence Δn or they can have low values for the birefringence Δn.

In accordance with the invention, the mixture is subjected to a polymerisation reaction in a subsequent process step.

The invention therefore furthermore relates to the mixture resulting from the polymerisation reaction of the above-mentioned mixture.

Preferred embodiments of the liquid-crystalline compound, the monofunctional monomer compound, the multifunctional monomer compound, the monoacrylate compound and the diacrylate compound in the above-mentioned mixtures are the same as indicated above.

In the course of the present invention, it has been found that the use of high concentrations of monomer compounds having high values for the birefringence results in an increase in the residual transmission and a reduction in the sensitivity of the switching process (type B switching element, cf. above).

Conversely, the use of monomer compounds having low values for the birefringence and/or the use of low concentrations of monomer compounds enables low residual transmission and high sensitivity of the switching process to be achieved (type A switching element, cf. above).

The present invention therefore enables the properties of the switching element to be adjusted variably between types A and B.

In particular, it has been found in the course of the present invention that the ratio of the proportions of multifunctional monomer to monofunctional monomer has a great influence on the properties of the switching element. Variation of the proportions enables the properties of the switching element to be adjusted variably between types A and B.

In particular, it has again been found that monomer compounds containing two or more acrylate groups have a greater effect on the residual transmission and sensitivity of the switching process than monomer compounds containing one acrylate group.

The use of monomer compounds containing two or more acrylate groups and having high birefringence Δn results in switching elements of type B, in particular if high concentrations of these monomer compounds are employed.

By contrast, it has been found that the use of monomer compounds containing one acrylate group and having high birefringence Δn alone, even in high concentration, does not result in switching elements of type B, i.e. does not cause a relevant increase in the residual transmission or a relevant reduction in the sensitivity of the switching process.

Particular preference is therefore given to the use of a mixture comprising at least one liquid-crystalline compound, at least one monoacrylate compound and at least one diacrylate compound in the above-mentioned switching element of type B, where the diacrylate compound has a birefringence Δn of greater than 0.1, preferably greater than 0.12 and particularly preferably greater than 0.15, and is employed in a concentration of greater than 4%, preferably greater than 6% and very particularly preferably greater than 8%.

Particular preference is therefore furthermore given to the use of a mixture comprising at least one liquid-crystalline compound, at least one monoacrylate compound and at least one diacrylate compound in the above-mentioned switching element of type A, where the diacrylate compound has a birefringence Δn of less than 0.15, preferably less than 0.12 and particularly preferably less than 0.1, and/or is employed in a concentration of less than 4%, particularly preferably less than 3% and very particularly preferably less than 2%.

The following working examples are intended to describe and illustrate the present invention in greater detail. They are not intended to be restrictive with respect to the scope of the invention.

WORKING EXAMPLES

Example 1

Mixtures 1, 2, 3 and 4 are prepared. They each comprise LC mixture A, which has the following composition:

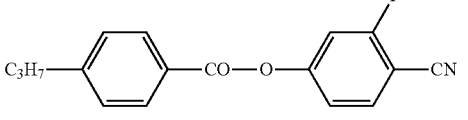

-continued

| LC mixture A LC compound | % |
|---|---|
| C$_4$H$_9$—⬡—CO—O—⬡(F)—CN  PZG—4-N | 9 |
| C$_5$H$_{11}$—⬡—CO—O—⬡(F)—CN  PZG—5-N | 9 |
| C$_1$H$_3$—⬡—CO—O—⬡—C$_5$H$_{11}$  PZP-1-5 | 10 |
| C$_1$H$_3$O—⬡—CO—O—⬡—C$_1$H$_3$  PZP—1O-1 | 17 |
| C$_1$H$_3$O—⬡—CO—O—⬡—C$_5$H$_{11}$  PZP—1O-5 | 16 |
| C$_3$H$_7$—⬢—⬡—CN  CP—3-N | 12 |
| C$_2$H$_5$—⬡—⬡—CN  PP—2-N | 10 |
| C$_3$H$_7$—⬡—⬡(F,F)—⬡(F,F,F)  PGU—3-F | 9 |
| C$_3$H$_7$—⬢—⬡—CO—O—⬡(F)—CN  CPZG—3-N | 3 |
| C$_4$H$_9$—⬢—⬡—CO—O—⬡(F)—CN  CPZG—4-N | 3 |

S-811 is a chiral dopant (structure see description). The compounds denoted by the abbreviation RM are monomers. Their structures are depicted in a table above. Mixtures 2 and 4 each correspond to mixtures 1 and 3 with the difference that the initiator compound Irgacure (structure see description) has been added and the polymerisation has been carried out.

Mixture 1: LC mixture A+0.1% of S-811+1.8% of RM-D1 (diacrylate)+18.2% of RM-M1 (monoacrylate).

Mixture 2: LC mixture A+0.1% of S-811+1.8% of RM-D1 (diacrylate)+18.2% of RM-M1 (monoacrylate)+0.2% of Irgacure 907. Polymerised state.

Mixture 3: LC mixture A+0.1% of S-811+10% of RM-D1 (diacrylate)+10% of RM-M1 (monoacrylate).

Mixture 4: LC mixture A+0.1% of S-811+10% of RM-D1 (diacrylate)+10% of RM-M1 (monoacrylate)+0.2% of Irgacure 907. Polymerised state.

The mixtures are introduced into a switching element according to the invention, where they represent the switching layer. The switching layer in the embodiment of a TN cell is present in a layer thickness of 4 microns. The polarisers of the switching element are in the crossed position (90°).

Figure 1:
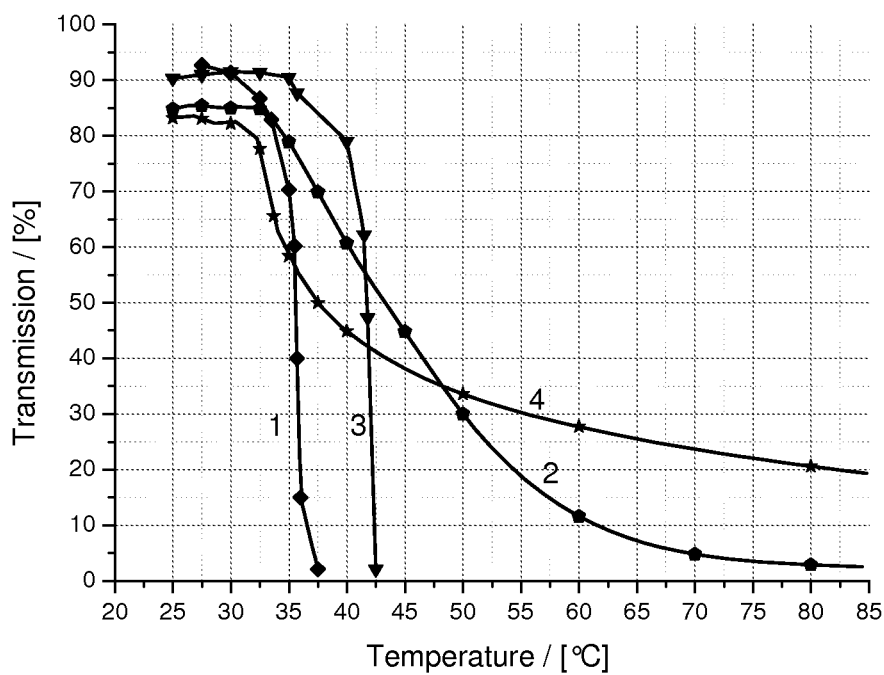
FIG. 1-4 are graphs of transmission vs. temperature

FIG. 1 shows the change in transmission for the four mixtures, in each case as a function of the temperature.

It is clearly evident that, even after polymerisation, an S-shaped curve is obtained for the transmission as a function of the temperature, i.e. substantially constant transmission in the two regions with significantly higher temperature or significantly lower temperature than the temperature of the clearing point and rapidly changing transmission with temperature in the vicinity of the temperature of the clearing point. The clearing point is significantly shifted to higher temperatures for curve 2 compared with curve 1, and is significantly shifted to lower temperatures for curve 4 compared with curve 3. Curves 2 and 4 have residual transmission in the "closed state" and reduced sensitivity of the switching process as a function of the temperature (less-steep curve in the region of the clearing point). Curves 2 and 4 differ from one another, in particular, with respect to the residual transmission at relatively high temperatures. This is significantly higher in the case of curve 4 than in the case of curve 2.

It should furthermore be emphasised that mixtures 2 and 4 have a homogeneous appearance and no visible light scattering.

Example 2

Mixtures 1, 2, 3 and 4 are prepared and polymerised (curing for 3 min., 360 nm edge filter, 37 mW/cm$^2$).

They all comprise the following base mixture:
59.7% of LC mixture A+5% of CGPC-3-3+5% of CPZG-3-N+0.1% of S-811+0.2% of Irgacure 651

CGPC-3-3

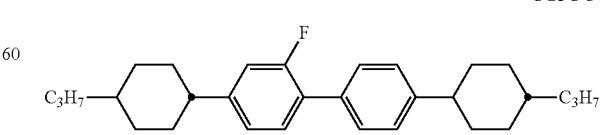

In addition, mixture 1 comprises:
15% of RM-M2 (monoacrylate, low delta-n)+15% of RM-D2 (diacrylate, low delta-n)

In addition, mixture 2 comprises:

15% of RM-M1 (monoacrylate, high delta-n)+15% of RM-D2 (diacrylate, low delta-n)

In addition, mixture 3 comprises:

15% of RM-M2 (monoacrylate, low delta-n)+15% of RM-D1 (diacrylate, high delta-n)

In addition, mixture 4 comprises:

15% of RM-M1 (monoacrylate, high delta-n)+15% of RM-D1 (diacrylate, high delta-n)

The substance properties of monomers RM-M2, RM-M1, RM-D2 and RM-D1 are shown in the following table (structures cf. table above):

| Substance | Acrylate type | Extrapolated clearing point | Extrapolated delta-n |
|---|---|---|---|
| RM-M2 | Monoacrylate | −27.7° C. | 0.0196 |
| RM-M1 | Monoacrylate | 57.4° C. | 0.1329 |
| RM-D2 | Diacrylate | −22.0° C. | 0.0874 |
| RM-D1 | Diacrylate | 138.5° C. | 0.1490 |

The mixtures are introduced into a switching element according to the invention, where they represent the switching layer. The switching layer in the embodiment of a TN cell is present in a layer thickness of 4 microns. The polarisers of the switching element are in the crossed position (90°).

Figure 2:
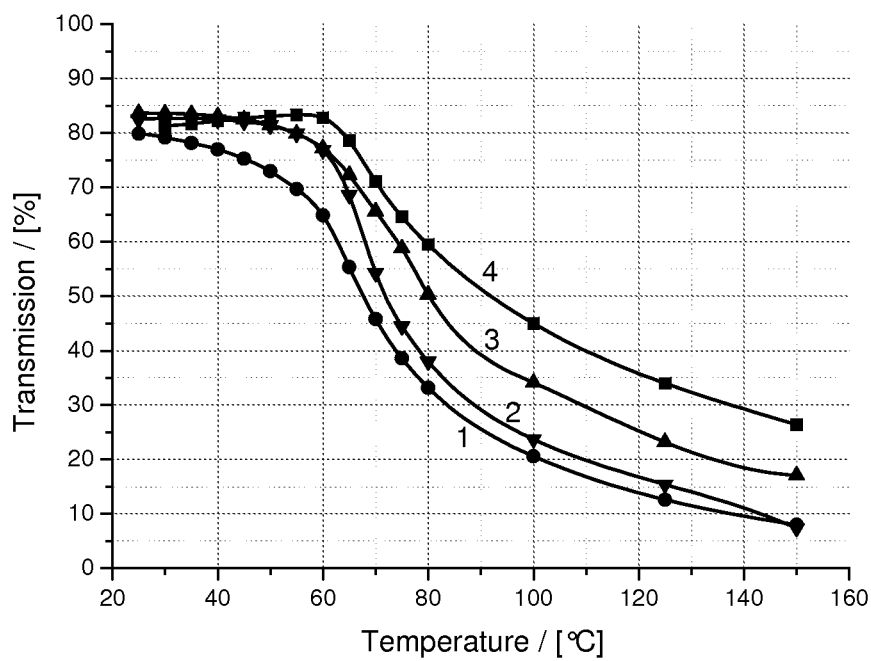

FIG. 2 shows the change in transmission for the four mixtures, in each case as a function of the temperature.

The mixtures again have a homogeneous appearance and no visible light scattering.

It is clearly evident that the residual transmission increases on changing from mixture 1 via mixture 2 via mixture 3 to mixture 4. Furthermore, the sensitivity of the switching process drops from mixture 1 via mixture 2 via mixture 3 to mixture 4.

The switching element containing mixture 1 represents a switching element of type A (low residual transmission and high sensitivity of the switching process), whereas the switching element containing mixture 4 represents a switching element of type B (high residual transmission and low sensitivity of the switching process). The switching elements containing mixture 2 or mixture 3 represent transitional forms.

The present example thus shows how different transmission curves of the switching elements, corresponding to the type A and type B switching elements according to the invention depicted above and in the description, can be obtained through a suitable choice of monoacrylates and diacrylates having different values for the birefringence.

Example 3

10 mixtures are prepared, all comprising the components LC mixture A, CPZG-3-N, CGPC-3-3, Irgacure 651 and S-811. In addition, monomer compounds RM-M2 and RM-D1 (cf. above) are present in the ratio 1:1 in an increasing proportion (4% to 40%).

The precise concentrations of the mixtures are as follows:

LC mixture A (89.7-x %)+CPZG-3-N (5%)+CGPC-3-3 (5%)+Irgacure 651 (0.2%)+S-811 (0.1%)+x/2% of RM-M2+x/2% of RM-D1, where x=4% for mixture 1
x=6% for mixture 2
x=8% for mixture 3
x=10% for mixture 4
x=12% for mixture 5
x=15% for mixture 6
x=17% for mixture 7
x=20% for mixture 8
x=30% for mixture 9
x=40% for mixture 10.

The monomers in each case represent a monoacrylate having low birefringence (RM-M2) and a diacrylate having high birefringence (RM-D1).

The mixtures are introduced into a switching element according to the invention, where they represent the switching layer. The switching layer in the embodiment of a TN cell is present in a layer thickness of 4 microns. The polarisers of the switching element are in the crossed position (90°).

Figure 3:
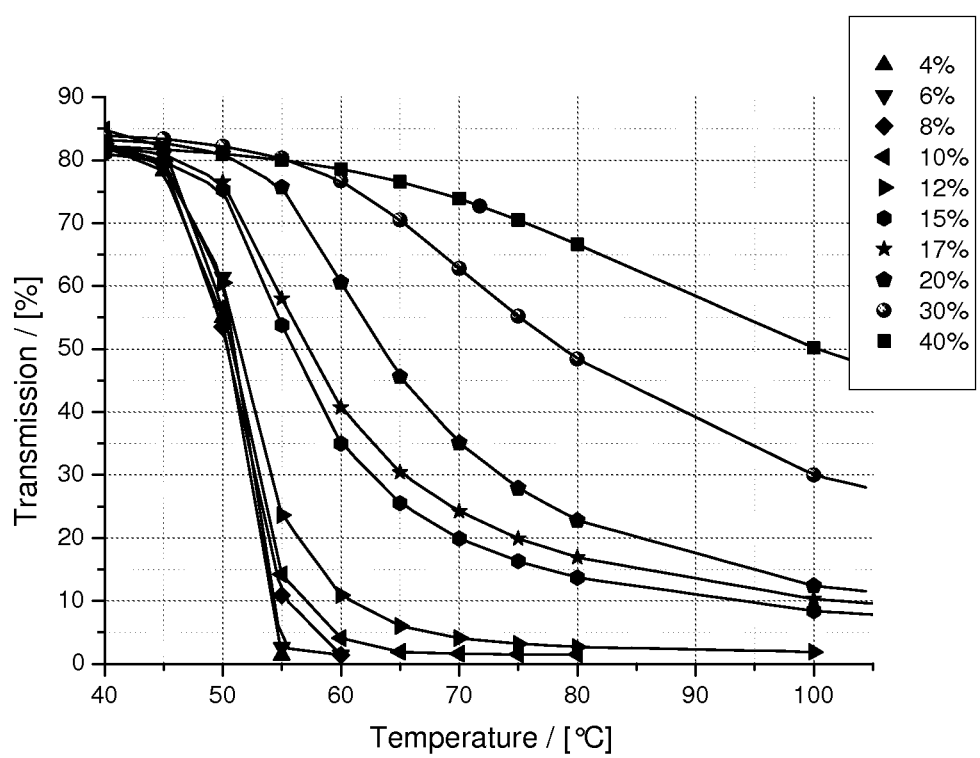

FIG. 3 shows the change in transmission for the mixtures, in each case as a function of the temperature.

The example shows that, as in Example 2, a transition between switching elements of type A to switching elements of type B can be achieved, this time by increasing the concentration of the monomers in the mixture.

In contrast to Example 2, mixtures having very low concentrations of monomer employed are also shown here. In these cases, very low residual transmission and high sensitivity of the switching process can be achieved.

Example 4

Mixtures 1 to 4 are prepared and polymerised.

They all comprise the same base mixture:

LC mixture A (99.7-x %), 0.1% of S-811 and 0.2% of Irgacure 907.

In addition, mixture 1 comprises:

x=10% of monomers comprising RM-M1 (monoacrylate): RM-D1 (diacrylate)=10:1

In addition, mixture 2 comprises:

x=20% of monomers comprising RM-M1 (monoacrylate): RM-D1 (diacrylate)=10:1

In addition, mixture 3 comprises:

x=10% of monomers comprising RM-M1 (monoacrylate): RM-D1 (diacrylate)=1:1

In addition, mixture 4 comprises:

x=20% of monomers comprising RM-M1 (monoacrylate): RM-D1 (diacrylate)=1:1

The mixtures are introduced into a switching element according to the invention, where they represent the switching layer. The switching layer in the embodiment of a TN cell is present in a layer thickness of 4 microns. The polarisers of the switching element are in the crossed position (90°).

The mixtures again have a homogeneous appearance and no visible light scattering.

Figure 4:
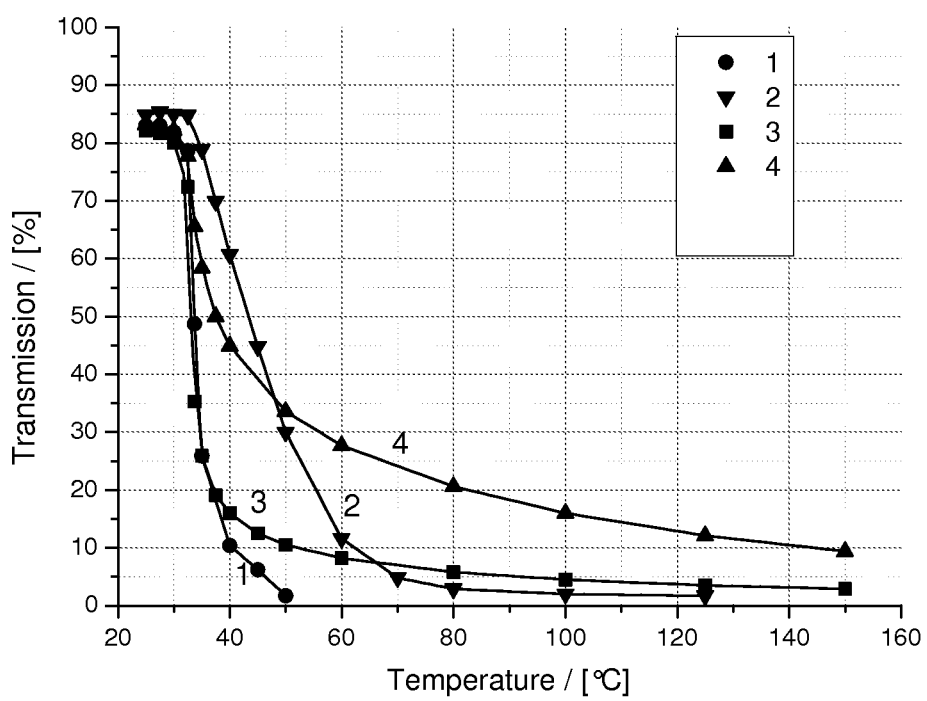

FIG. 4 shows the change in transmission for the four mixtures, in each case as a function of the temperature.

It becomes clear that increased residual transmission and reduced sensitivity of the switching process occur with an increase in the amount of monomer employed in both cases (mixture 2 compared with 1 and 4 compared with 3).

However, there is a significant difference between mixtures 4 and 2 with respect to the residual transmission: in mixture 4, which comprises a high proportion of diacrylate (ratio 1:1), the residual transmission is significantly higher than in mixture 2 having a low content of diacrylate (diacrylate to monoacrylate ratio 1:10) with the same total concentration of monomer.

However, the sensitivity of the switching process is similar in the case of both mixtures.

The residual transmission level can therefore be influenced by variation of the diacrylate content with the same total concentration of monomer, substantially independently of the sensitivity of the switching process.

The invention claimed is:

1. Temperature-controlled switching element for the regulation of light transmission, comprising
   a first polariser
   a polarisation-influencing switching layer which comprises at least one liquid-crystalline compound and at least one polymer, where the polymer comprises at least one recurring unit containing one or more mesogenic groups where the polymer is formed from a mixture comprising at least one monoacrylate mesogenic compound and at least one diacrylate mesogenic compound, where the diacrylate mesogenic compound has a birefringence Δn of greater than 0.1, and
   a second polariser,
where the switching layer is arranged between the two polarisers.

2. Switching element according to claim 1, characterised in that it has, as switching states, a switching state having relatively high light transmission through the switching element and a switching state having relatively low light transmission through the switching element.

3. Switching element according to claim 2, characterised in that the switching state having relatively high light transmission through the switching element exists at relatively low temperatures of the switching element, and the switching state having relatively low light transmission exists at relatively high temperatures of the switching element.

4. Switching element according to claim 2, characterised in that the state of the switching layer in the switching state having relatively high light transmission is a twisted nematic state, and in that the state of the switching layer in the switching state having relatively low light transmission is an isotropic state.

5. Switching element according to claim 1, characterised in that it is installed in a structural opening of a building or another compartment which is sealed off from the outside.

6. Switching element according to claim 1, characterised in that it has an area of at least 0.05 m$^2$.

7. Switching element according to claim 1, characterised in that it is flexible in shape and bendable.

8. Switching element according to claim 1, characterised in that the polymer is present in the switching layer in a proportion of at most 30%.

9. Switching element according to claim 1, characterised in that the polymer is formed by UV light-induced polyaddition.

10. A method which comprises using the switching element according to claim 1 to influence the light transmission and/or heat input into a room as a function of temperature.

11. A method according to claim 10, where the light transmission is influenced by the switching element at a wavelength in the range from 1000 to 1500 nm.

* * * * *